US012789453B2

(12) United States Patent
Mansouri et al.

(10) Patent No.: US 12,789,453 B2
(45) Date of Patent: Nov. 10, 2026

(54) RESIN TANK AND SCRAPER SYSTEM AND METHOD FOR USE WITH A THREE-DIMENSIONAL PRINTER

(71) Applicant: SprintRay, Inc., Los Angeles, CA (US)

(72) Inventors: Amir Mansouri, Los Angeles, CA (US); Huijian Tian, Los Angeles, CA (US); Shukun Ye, Los Angeles, CA (US); Eric Leal, Los Angeles, CA (US); Hossein Bassir, Los Angeles, CA (US); Songwei Li, Los Angels, CA (US); Guoqing Yin, ZheJiang (CN); Jianhuan Xie, ZheJiang (CN)

(73) Assignee: SprintRay, Inc., Los Angeles, CA (US)

( * ) Notice: Subject to any disclaimer, the term of this patent is extended or adjusted under 35 U.S.C. 154(b) by 75 days.

(21) Appl. No.: 18/106,962

(22) Filed: Feb. 7, 2023

(65) Prior Publication Data

US 2023/0249407 A1 Aug. 10, 2023

Related U.S. Application Data

(60) Provisional application No. 63/307,401, filed on Feb. 7, 2022.

(51) Int. Cl.
*B29C 64/245* (2017.01)
*B29C 64/124* (2017.01)
(Continued)

(52) U.S. Cl.
CPC .......... *B29C 64/214* (2017.08); *B29C 64/124* (2017.08); *B29C 64/259* (2017.08);
(Continued)

(58) Field of Classification Search
CPC ... B29C 64/214; B29C 64/124; B29C 64/259; B29C 64/321; B29C 64/393; B29C 64/343; B33Y 30/00; B33Y 40/00; B33Y 50/02
See application file for complete search history.

(56) References Cited

U.S. PATENT DOCUMENTS 9,176,016 B2 11/2015 Konkle
9,561,624 B1 2/2017 Wu
(Continued)

FOREIGN PATENT DOCUMENTS

CN 214000586 U 8/2021
CN 217144909 U 8/2022
(Continued)

OTHER PUBLICATIONS

English translation of CN 217144909U (Year: 2022).*

*Primary Examiner* — Galen H Hauth
*Assistant Examiner* — Baileigh Kate Darnell
(74) *Attorney, Agent, or Firm* — Jafari Law Group, Inc.

(57) ABSTRACT

A three-dimensional (3D) printing system is provided. The printing system includes a resin tank assembly with a sliding scraper, an automatic resin dispensing system, sensors configured to measure various aspects of the system, e.g., the volume of resin within the resin tank and/or within the resin dispensing system, a rigid releasable interface between the lift arm and the build platform, a resin heating system, a magnetic interface between the resin tank and the base assembly, a resin tank locking system, and other novel aspects.

16 Claims, 26 Drawing Sheets

(51) Int. Cl.

| | |
|---|---|
| ***B29C 64/214*** | (2017.01) |
| ***B29C 64/227*** | (2017.01) |
| ***B29C 64/259*** | (2017.01) |
| ***B29C 64/321*** | (2017.01) |
| ***B29C 64/393*** | (2017.01) |
| ***B33Y 30/00*** | (2015.01) |
| ***B33Y 40/00*** | (2020.01) |
| ***B33Y 50/02*** | (2015.01) |

(52) U.S. Cl.

CPC .......... *B29C 64/321* (2017.08); *B29C 64/393* (2017.08); *B33Y 30/00* (2014.12); *B33Y 40/00* (2014.12); *B33Y 50/02* (2014.12)

(56) References Cited

U.S. PATENT DOCUMENTS

| | | | | |
|---|---|---|---|---|
| 10,500,831 | B2 | 12/2019 | Share | |
| 2017/0057174 | A1 | 3/2017 | Megretski et al. | |
| 2019/0232559 | A1* | 8/2019 | Thompson | B33Y 30/00 |
| 2019/0283323 | A1 | 9/2019 | Pokorny et al. | |
| 2020/0147881 | A1* | 5/2020 | Medalsy | B29C 64/35 |
| 2020/0282648 | A1 | 9/2020 | Schalk et al. | |
| 2020/0316869 | A1* | 10/2020 | Moldave | B29C 64/35 |
| 2020/0331209 | A1* | 10/2020 | Ong | B29C 64/232 |
| 2021/0206075 | A1 | 7/2021 | Barribeau et al. | |
| 2021/0245427 | A1* | 8/2021 | Chen | B29C 64/245 |
| 2021/0354473 | A1* | 11/2021 | Ward | B41J 2/17566 |
| 2021/0370884 | A1 | 12/2021 | Clift et al. | |

FOREIGN PATENT DOCUMENTS

| | | | |
|---|---|---|---|
| WO | WO2020176487 | A1 | 9/2020 |
| WO | WO2020236657 | | 11/2020 |
| WO | WO2021263234 | | 12/2021 |

* cited by examiner

RESIN TANK AND SCRAPER SYSTEM AND METHOD FOR USE WITH A THREE-DIMENSIONAL PRINTER

FIELD OF THE INVENTION

This invention relates to three-dimensional printers, including a resin tank and scraper system for use with three-dimensional printer systems.

BACKGROUND

Three-dimensional (3D) printing systems are being used throughout the world for a wide variety of industries. As is known, during the 3D printing of an object, photosensitive resin within a resin tank is irradiated to harden and to form the object layer-by-layer.

However, knowing if the amount of resin within the resin tank is sufficient to successfully print any given object is oftentimes difficult to ascertain thereby leading to incomplete print jobs and/or wasted excess resin. Dispensing the correct amount of resin into the tank also is an issue. In addition, when debris forms on the bottom of the resin tank it is required to be removed. However, because resin is typically still in the tank when the debris must be removed, the resin also must be removed leading to further wasted resin. Also, many current 3D printing systems that allow easy removal of the build platform from the lift arm do not include an adequately rigid interface between the lift arm and the build platform attached thereto, leading to inaccurate printing.

Accordingly, there is a need for a 3D printing system that addresses these and other problems.

SUMMARY

According to one aspect, one or more embodiments are provided below for a 3D printing system and its method of use.

One aspect of the invention involves a resin tank assembly for use with a three-dimensional printing system. In exemplary embodiments, the resin tank assembly may include: a tank defined by a first side, a second side opposite the first side, and a tank inner surface extending between the first side and the second side, the tank inner surface defining a print area, the tank adapted to hold a first amount of photosensitive resin within the print area; a resin storage area configured with the first side of the tank and opposite the print area, and adapted to hold a second amount of photosensitive resin; a resin reflux area configured with the second side of the tank and opposite the print area, and adapted to hold a third amount of photosensitive resin; and a scraper assembly configured with the tank and adapted to move at least a portion of the first amount of photosensitive resin from the print area into the resin storage area and into the resin reflux area.

In some exemplary embodiments, the resin tank assembly further comprises: a track extending between the tank first side and the tank second side; and a sliding block slidably coupled to the track, wherein the scraper assembly is coupled to the sliding block and configured to move along the track. In some exemplary embodiments, the scraper assembly includes a scraper member configured to contact the first amount of resin in the print area and to move it into the storage area and into the reflux area, the scraper member releasably magnetically coupled to the sliding block and configured to move in a direction parallel to the track.

In some exemplary embodiments, the resin storage area includes a storage area inner surface that is in fluid communication with the tank inner surface and that extends away from the tank inner surface at an obtuse angle. In some exemplary embodiments, the resin storage area includes a resin outlet leading to an area outside the tank.

In some exemplary embodiments, the resin tank assembly further comprises a base configured beneath the tank; wherein the tank is releasably magnetically coupled to the base.

In some exemplary embodiments, the resin tank assembly further comprises a cartridge adapted to hold a fourth amount of photosensitive resin and to dispense at least a portion of the fourth amount of photosensitive resin into the resin storage area. In some exemplary embodiments, the resin tank assembly further comprises a controller and wherein the cartridge includes a sensor configured to measure a weight of the cartridge and to provide information based on the measured weight to the controller. In some exemplary embodiments, the resin tank assembly further comprises a controller and wherein the cartridge includes a valve and the controller is configured to control the valve to dispense the at least a portion of the fourth amount of photosensitive resin into the resin storage area.

In some exemplary embodiments, the resin tank assembly further comprises an air heating assembly configured to provide heated air directly to a top surface of the first amount of photosensitive resin within the print area.

Another aspect of the invention involves a resin cartridge assembly for use with a three-dimensional printing system. In exemplary embodiments, the resin cartridge assembly may include: a cartridge adapted to hold a first amount of photosensitive resin; a valve configured with the cartridge; and an electronic actuator configured with the valve and adapted to cause the valve to dispense at least a portion of the first amount of photosensitive resin into a printing area of the three-dimensional printing system.

In some exemplary embodiments, the electronic actuator includes a working stroke that is controllable to alter a flow rate of the at least a portion of the first amount of photosensitive resin through the valve from a first positive flow rate to a second positive flow rate.

In some exemplary embodiments, the resin tank assembly further includes: a controller; and a sensor configured to measure a weight of the cartridge and to provide information based on the measured weight to the controller.

Yet another aspect of the present invention includes a method of dispensing photosensitive resin into a three-dimensional printing system resin tank. In exemplary embodiments, the method may include: receiving information regarding an object to be three-dimensionally printed; determining, based at least in part on the information received in, a first amount of photosensitive resin required to three-dimensionally print the object; determining a second amount of photosensitive resin contained in the three-dimensional printing system resin tank; comparing the second amount of photosensitive resin to the first amount of photosensitive resin to determine if the second amount of photosensitive resin is less than the first amount of photosensitive resin; and upon a determination that the second amount of photosensitive resin is less than the first amount of photosensitive resin, then: causing a container of photosensitive resin to dispense into the three-dimensional printing system resin tank only a third amount of photosensitive resin, wherein the third amount of photosensitive resin is equal to the difference between the first amount of photosensitive resin and the second amount of photosensitive resin.

In some exemplary embodiments, the method further includes calculating a weight of the third amount of photosensitive resin; using a sensor to monitor a weight of the container of photosensitive resin until the container's weight has decreased by the weight of the third amount of photosensitive resin; and stopping the container of resin from dispensing photosensitive resin.

Yet another aspect of the present invention include a method of removing debris from a tank associated with a three-dimensional printing system, the tank including a printing area, a resin storage area located outside a first side of the printing area, and a resin reflux area located outside a second side of the printing area opposite the first side of the printing area, and a scraper configured to move an amount of photosensitive resin from the printing area into the storage area and into the reflux area. In exemplary embodiments, the method may include: moving, using the scraper, a first portion of the amount of photosensitive resin from the printing area into the storage area leaving a second portion of the amount of photosensitive resin in the printing area; removing the debris from the tank; moving, using the scraper, the second portion of the amount of photosensitive resin from the printing area into the reflux area.

In some exemplary embodiments, the method further includes moving, using the scraper, the second portion of the amount of photosensitive resin from the reflux area into the storage area.

Yet another aspect of the present invention includes a three-dimensional printing system. In exemplary embodiments, the system may include: a resin tank including a printing area, a resin storage area located outside a first side of the printing area, and a resin reflux area located outside a second side of the printing area opposite the first side of the printing area; a track extending between the first side of the printing area and the second side of the printing area; a sliding block slidably coupled to the track; a scraper member releasably magnetically coupled to the sliding block and configured to translate in a direction parallel to the track and to move an amount of photosensitive resin from the printing area into the storage area and into the reflux area; and a cartridge configured to dispense a first amount of photosensitive resin into the storage area, the cartridge including a valve through which the first amount of photosensitive resin is dispensed, a valve actuator configured to open and/or close the valve, and a sensor configured to measure a weight of the cartridge.

In some exemplary embodiments, the system may further include: an air heating assembly configured to provide heated air directly to a top surface of the amount of photosensitive resin within the print area.

In some exemplary embodiments, the system may further include: a base configured beneath the resin tank; wherein the resin tank is releasably magnetically coupled to the base.

The presently disclosed 3D printing system and its method of use is more fully described in the detailed description below.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

DETAILED DESCRIPTION OF EXEMPLARY EMBODIMENTS

Figure 1:
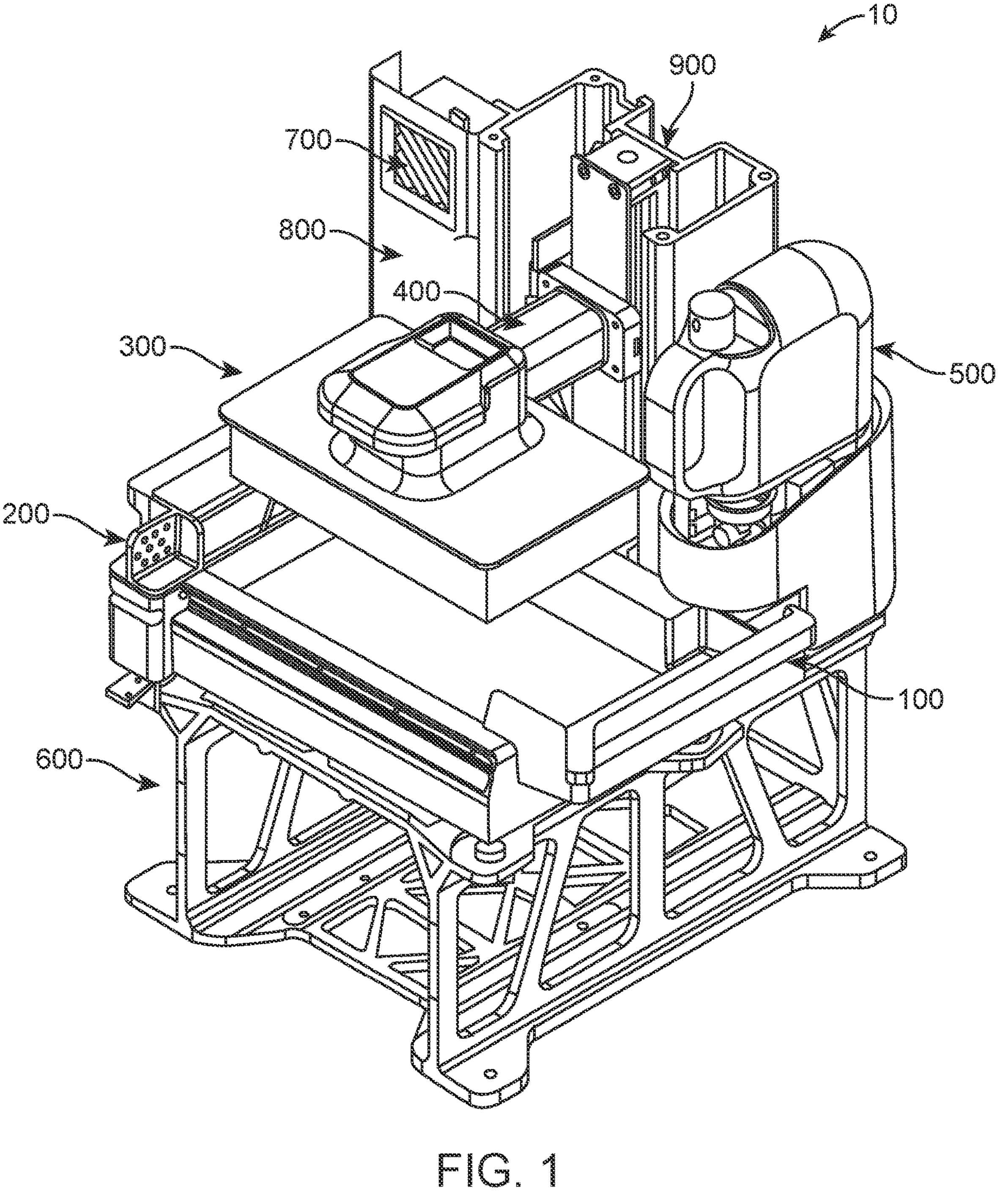
FIG. 1 shows a 3D printing system in accordance with exemplary embodiments hereof.

FIG. 1 shows an isometric schematic of a three-dimensional (3D) printing system 10 (also referred to herein as simply the system 10) according to exemplary embodiments hereof. In some embodiments, as shown, the 3D printing system 10 includes a resin tank assembly 100, a scraper assembly 200 configured with the resin tank assembly 100, a build platform assembly 300, a printing arm assembly 400, a resin cartridge assembly 500, a base assembly 600, a heated air system 700, a detection system 800, and an elevator assembly 900. The system 10 also may include other elements as necessary for the system 10 to perform its functionalities, e.g., the system 10 may include an illumination system designed to irradiate photosensitive resin held within the resin tank assembly 100 to form a 3D printed object. In addition, the system 10 preferably includes a controller (e.g., a computer) configured to control the various assemblies and systems of the system 10 as required during the 3D printing process or otherwise. Accordingly, and for the purposes of this specification, reference herein to the system 10 will mean the inclusion of a controller.

Resin Tank Assembly 100

Figure 2:
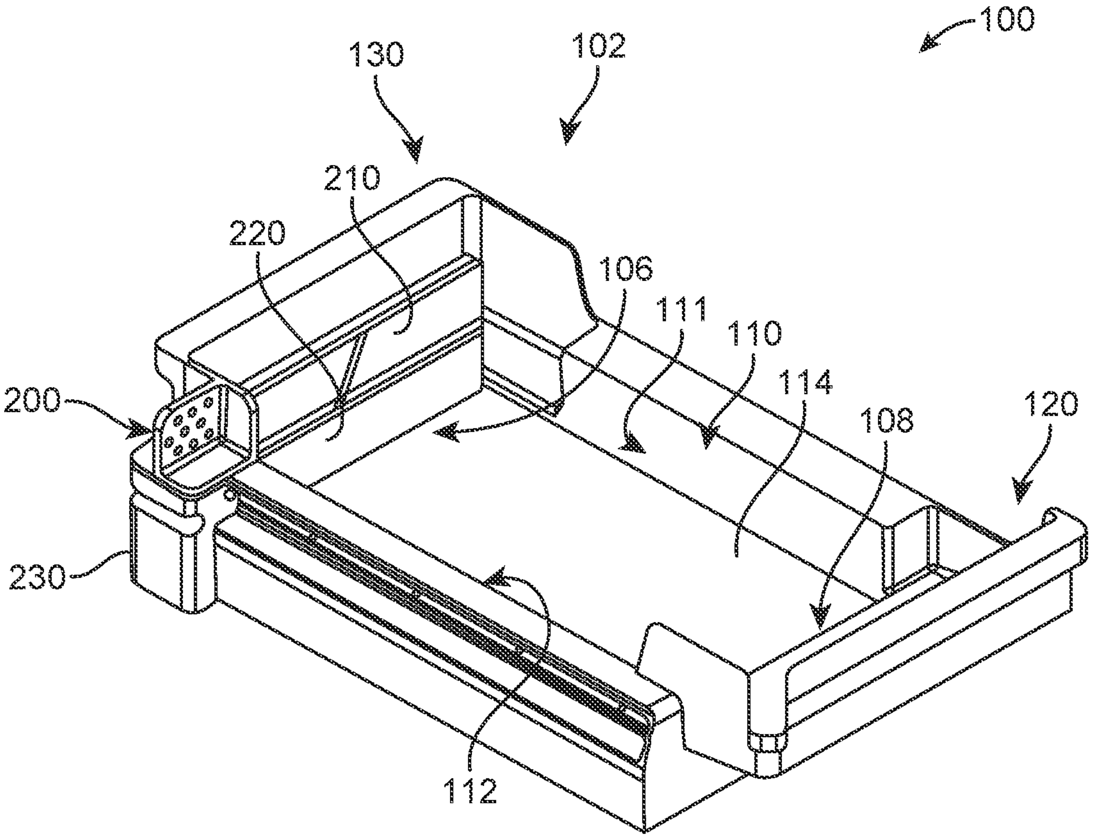
FIGS. 2-7 show aspects of a resin tank assembly in accordance with exemplary embodiments hereof.
Figure 3:
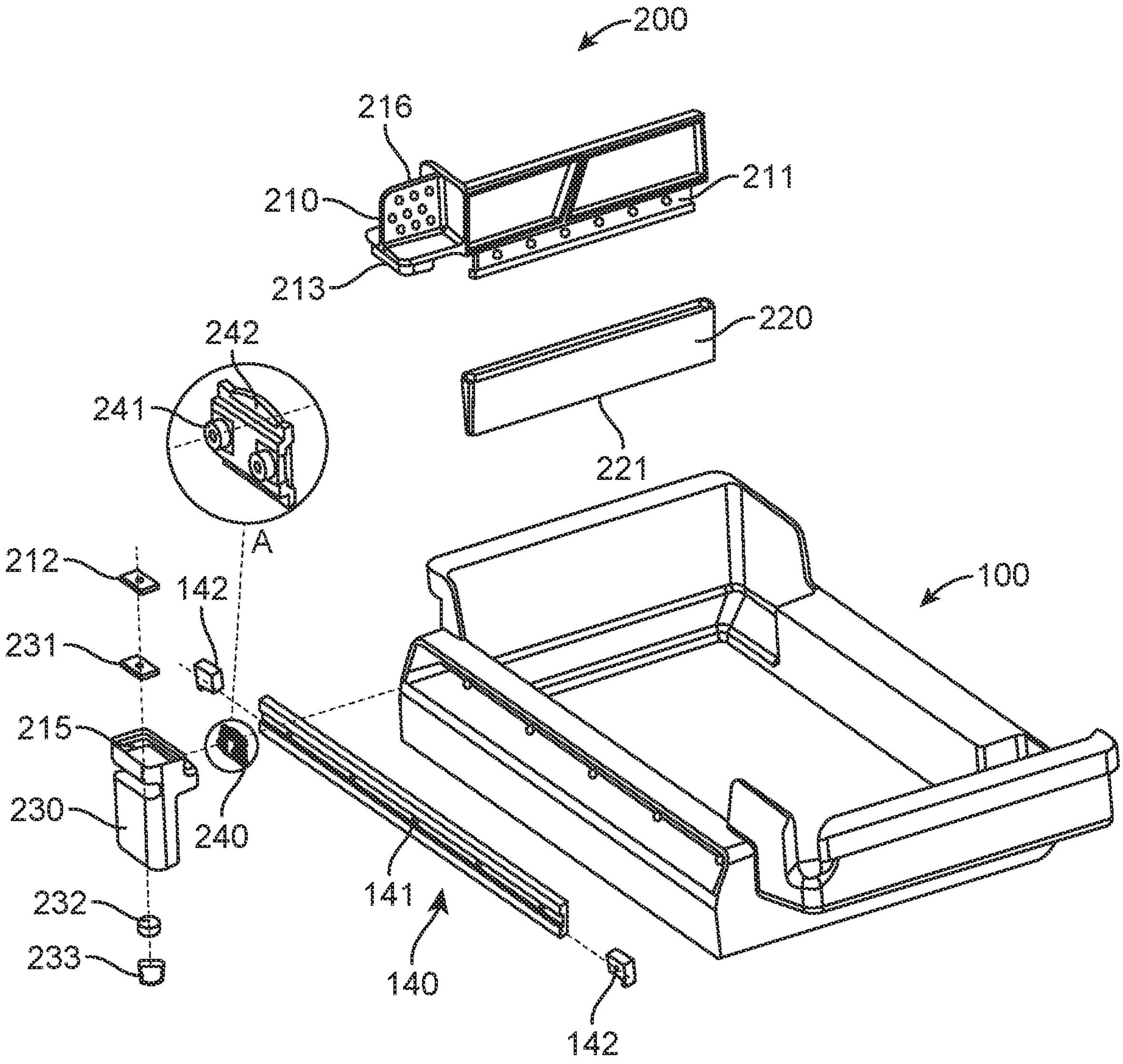
Figure 4:
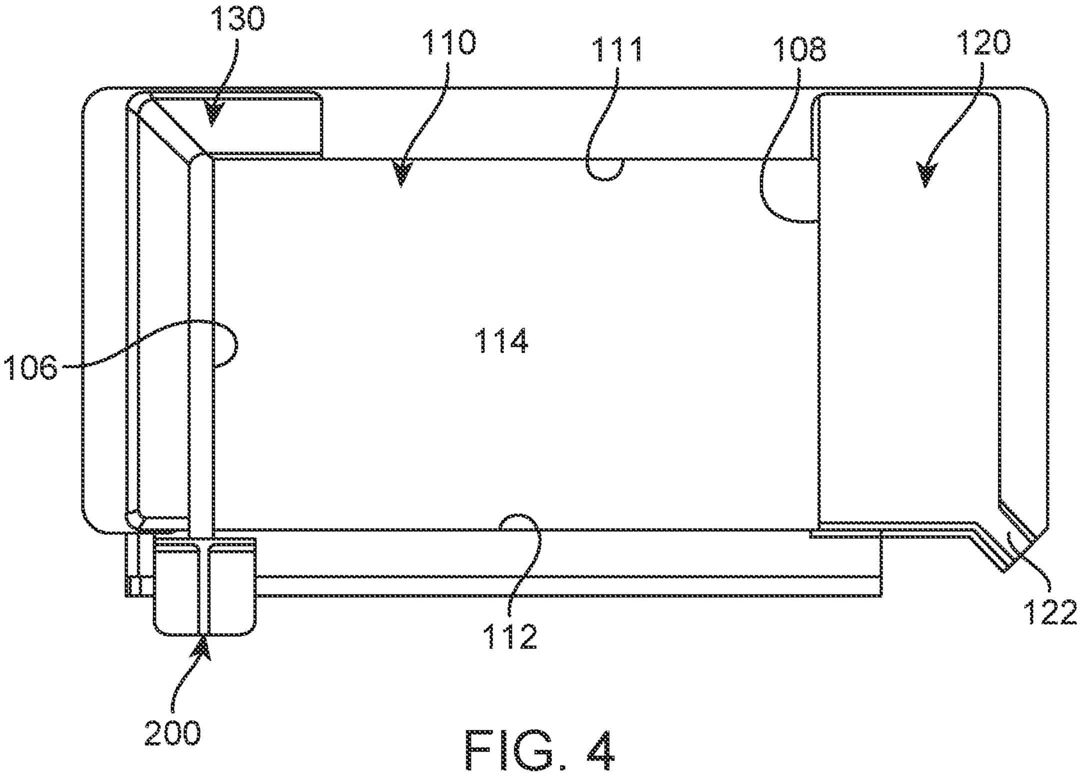
Figure 5:
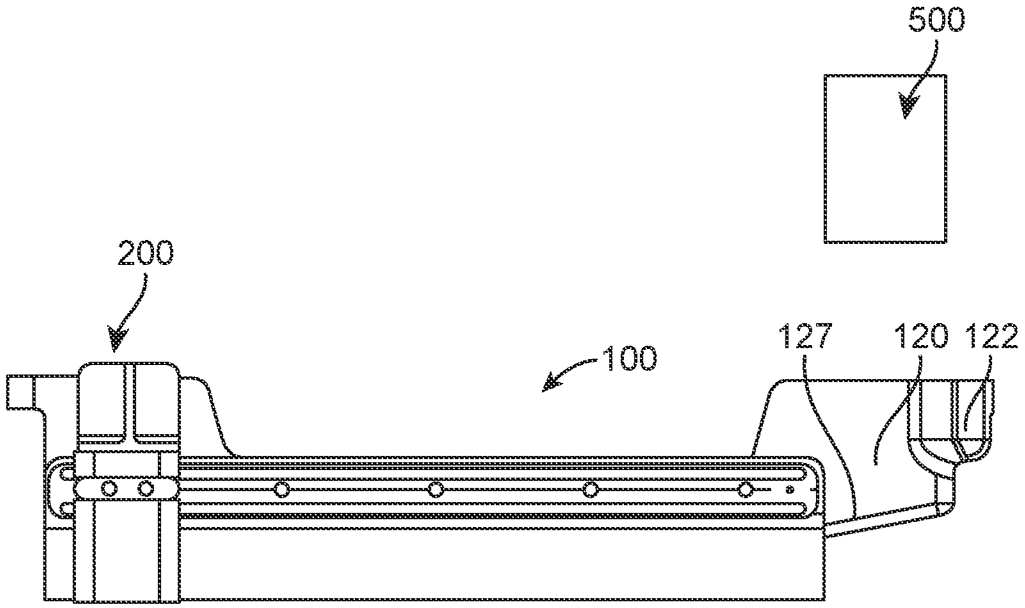

FIG. 2 shows a schematic of the resin tank assembly 100 and FIG. 3 shows an exploded view of the same. FIG. 4 shows a top view of the resin tank assembly 100 and FIG. 5 shows a side view of the resin tank assembly 100 taken from the perspective of looking into the assembly's front side 112 of FIG. 4.

In some embodiments, as shown in FIGS. 2 and 4, the resin tank assembly 100 includes a reservoir structure 102 including a printing area 110 defined by a first side 106 (e.g., a left side), a second side 108 (e.g., a right side), a third side 111 (e.g., a rear side), a fourth side 112 (e.g., a front side), and a bottom surface 114. The bottom surface 114 may include a membrane (e.g., a tensioned hydrophobic member) or other suitable bottom surface(s). Each side 106, 108, 111, 112 may include a sidewall thereby defining a printing area inner volume. The first side 106 and the second side 108 define the resin tank assembly's longitudinal axis.

While the reservoir structure 102 and the printing area 110 depicted in FIG. 2 are shown as generally rectangular, it is understood that the reservoir structure 102 and/or the printing area 110 may be formed as any suitable shapes and/or as any combinations of any suitable shapes.

In general, during the 3D printing process, photopolymer resin is placed in the printing area 110 and exposed to light from an illumination assembly to cure the resin into hardened plastic.

In some embodiments, the resin tank assembly 100 includes a resin storage area 120 and a reflux area 130. The resin storage area 120 and/or the reflux area 130 may each be in fluid communication with the printing area 110 so that resin may be moved from the printing area 110 to the storage area 120 and/or to the reflux area 130, and vice versa.

In some embodiments, as shown in FIGS. 2 and 4, the storage area 120 is located adjacent the resin storage area 120 to one side (e.g., the second side 108 (i.e., the right side)), and the reflux area 130 is located adjacent the resin storage area 120 on an opposite side (e.g., the first side 106 (i.e., the left side)). It also is understood that the storage area 120 may be located on the first side 106 and the reflux area on the second side 108. In any event, it is understood that the storage area 120 and/or the reflux area 130 may be located in any position with respect to the printing area 110 such that the storage area 120 and/or reflux area 130 may receive resin from the printing area 110 and/or provide resin to the printing area 110 as described herein.

In some embodiments, as shown in FIG. 5, the storage area 120 includes a bottom surface 127 that extends at an upward angle from the interface between the storage area 120 and the printing area 110 to a portion of the storage area 120 opposite the printing area 110. In this way, when unobstructed, resin residing in the storage area 120 may flow downward (due to gravity) from the storage area 120 and/or from the resin cartridge assembly 500 (described in other sections) into the printing area 110 in a smooth and controlled fashion. By doing so, the resin may not be overly agitated during its movement such that bubbles, splashing, and other types of disturbances may be avoided.

In some embodiments, as described in more detail in other sections, the scraping assembly 200 may be used to move the resin transversely from the printing area 110 to the storage area 120 and/or to the reflux area 130, and vice versa. In addition, in some embodiments, it may be desirable for the reservoir structure 102 to include a raised lip 125 (best seen in FIG. 6) protruding upward from the printing area's bottom surface 114 and extending from the printing area's rear side 110 to its front side 112 at the interface between the printing area 110 and the storage area 120. The height of the raised lip 125 may thereby define the level of resin that may reside in the printing area 110 without flowing into the storage area 120. It is understood that the raised lip 125 is optional depending on the arrangement of the resin tank assembly 100.

Scraper Assembly 200

In some embodiments, as shown in FIGS. 2-5, the resin tank assembly 100 includes a scraper assembly 200 designed to move resin residing within the printing area 110 from one location to another. For example, in some embodiments, the scraper assembly 200 may move resin from a first location within the printing area 110 to a different location within the printing area 110. In another example, the scraper assembly 200 may move resin from within the printing area 110 to a location outside the printing area 110, e.g., into the storage area 120 and/or reflux area 130. In general, the scraper assembly 200 is configured to scrape across the surface 114 of the printing area 110 and to push the resin in the direction of the scraper's movement (e.g., along the longitudinal axis of the resin tank assembly 100).

In some embodiments, as shown in FIG. 3, the scraper assembly 200 includes a scraper body 210 including a lower connecting member 211, and a blade 220 (preferably flexible) removably attached to the scraper body 210 via the connecting member 211. As shown in FIGS. 2-3, when coupled to the scraper body 210, the flexible blade 220 extends across at least a portion of the printing area 110. For example, as shown in FIG. 2, the flexible blade 220 may extend across the printing area 110 from the printing area's third side 111 (e.g., its rear side) to its fourth side 112 (e.g., its front side) thereby defining the flexible blade's longitudinal axis.

In some embodiments, as shown in FIGS. 2-3, the scraper blade 220 includes a lower edge 221 that may come into physical contact with the bottom surface 114 the printing area 110. In some embodiments, the scraper blade 220 and/or its lower edge 221 is formed of rubber, a self-lubricating material such as self-lubricating silicone, other suitable materials, and any combinations thereof. In this way, a seal is formed between the blade's lower edge 221 and the printing area surface 114 thereby ensuring that the resin moves only in the desired direction with none (or a minimized amount) of the resin residue left behind during the scraping process.

In some embodiments, as shown in FIGS. 2-3, the scraper body 210 is slidably configured with the resin tank assembly 100 via a scraper base 230 and a sliding block 240 configured with a sliding rail assembly 140 attached to a side of the resin tank 100. In some embodiments, the sliding rail assembly 140 includes a sliding rail 141 coupled to the outer front side 112 (or outer rear side 111) of the reservoir structure 102 and extending laterally from the structure's outer left side 106 to its outer right side 108. One portion of the sliding block 240 is coupled to the side of the scraper base 230 via nuts 241 and corresponding screws, and a second portion of the sliding block 240 (e.g., opposite the first portion) is slidably coupled to the sliding rail 141. As such, the scraper base 230 is slidably coupled to the sliding rail 141 via the sliding block 240 and is thereby able to move along the rail 141 from the left side 106 to the right side 108, and back (and/or along any portion thereof). In some embodiments, the sliding rail 141 includes far left and far right limit stops 142 to limit the far left and far right movement of the scraper base 230 via the rail 141.

In some embodiments, as shown in FIG. 3, the scraper base 230 is removably coupled to the scraper body 210 via magnets 212, 231 and respective corresponding connector elements 213, 215. In some embodiments, the connector element 213 may include a protrusion and the connector element 215 may include a cavity designed to releasably receive and hold the protrusion. Other types of connector elements also may be used. In some embodiments, the first magnet 212 may be coupled to the first connector element 213 (e.g., at the distal end of the protrusion) and the second magnet 231 may be coupled to the second connector element 215 (e.g., at the inner bottom surface of the cavity). In this way, when the scraper base 230 is removably coupled to the scraper body 210 via mating connector elements 213, 215, the magnets 212, 231 may attract one another thereby releasably holding the scraper base 230 to the scraper body 210. As such, with the scraper body 210 coupled to the scraper base 230, and the scraper base 230 slidably coupled to the sliding rail assembly 140, the scraper base 230 and the scraper body 210 combination may slide along the sliding rail 141 as a single unit.

In some embodiments, with the flexible blade 220 attached to the scraper body's connecting member 211, lateral movement of the flexible blade 220 within the print area 110 may be controlled via movement of the scraper base 230 and scraper body 210 combination. In addition, in some embodiments, the sliding block 240 includes one or more dampeners 242 (e.g., upper and/or lower dampeners 242) designed to dampen the movement of the scraper base 230 along the rail 141 such that inadvertent forces applied to the flexible blade 220 (e.g., from a volume of resin within the storage area 120 pushing on the blade 220) may not cause the blade 220 to move undesirably.

In some embodiments, as shown in FIG. 3, a sensor 233 (e.g., a Hall effect sensor) may be configured with the scraper base 230 (e.g., via a magnet 232 coupled to the lower side of the scraper base 230) and adapted to detect the lateral position of the scraper assembly 200 along the sliding rail assembly 140 in real time. In this way, proper positioning of the scraper assembly 200 may be monitored, controlled, and ensured.

In some embodiments, as shown in FIGS. 2-3, the scraper assembly 200 includes a handle 216 that a user may grasp to move the scraper assembly 200 (e.g., to move the scraper body 210, the scraper base 230, and/or the flexible blade 220) as described herein. In other embodiments, the scraper assembly 200 includes a movement mechanism (e.g., a motor) that may be engaged to move the scraper assembly 200 as desired.

In use, the scraper blade 220 may be positioned towards the second side 108 (e.g., at the right side) of the printing area 110, e.g., at the interface between the printing area 110 and the storage area 120. In this arrangement, it is preferable that the seal between the blade's lower edge 221 and the bottom surface 114 of the printing area 110 is sufficient to disallow the resin to flow back into the printing area 110. In this way, the scraper blade 220 acts as a sidewall to hold the resin within the storage area 120.

When it is desired to allow the resin to flow from the storage area 120 into the printing area 110 in preparation to the 3D printing process, a user may move the scraper assembly 200 to the left side 106 of the printing area 110, e.g., to the interface between the printing area 110 and the reflux area 130. In other embodiments, the scraper blade 220 may be lifted, and/or be otherwise removed from the fluid path between the storage area 120 and the printing area 110 to allow resin to flow from the storage area 120 to the printing area 110.

Once the printing process has completed (or otherwise), the remaining resin within the printing area 110 may be recycled. In this case, the scraper assembly 200 may be moved to the right side 108 of the printing area 110 so that the flexible blade 220 pushes residual resin from within the printing area 110 into the storage area 120. Once in the storage area 120, the resin may be recycled by moving it out of the storage area 120 through the outlet 122 and into the resin cartridge assembly 500 (described in other sections) and/or into another storage container. In some embodiments, the storage outlet 122 may be located at the far end of the storage area 120 opposite the printing area 110, e.g., in an upper corner portion of the storage area 120 as shown in FIGS. 2-3.

In some situations, during the printing process, debris may collect and/or adhere on the bottom surface 114 of the printing area 110 within the volume of resin. When this happens, some of the debris may obstruct the bottom edge 221 of the scraper blade 220 causing a gap to form between the blade's edge 221 and the surface 114 of the printing area 110 as the blade 220 warps to pass over the obstructing debris. In such a case, a small amount of resin may flow through the gap and remain in the printing area 110 after the scraper blade 220 has made its pass. This may cause an error message within the system 10 such that the debris and the remaining resin must be removed.

To do so, the debris may be removed (e.g., manually, or otherwise) and the scraper assembly 200 may be moved from the right side 108 (e.g., to the storage area 120) back to the left side 106 (e.g., to the reflux area 130) thereby pushing the remaining resin into the reflux area 130. Then, to recycle this remaining resin, the scraper assembly 200 may be moved back to the right side 108 thereby pushing the remaining resin into the storage area 120 where it may be recycled (and/or used for an ensuing printing process).

Figure 6:
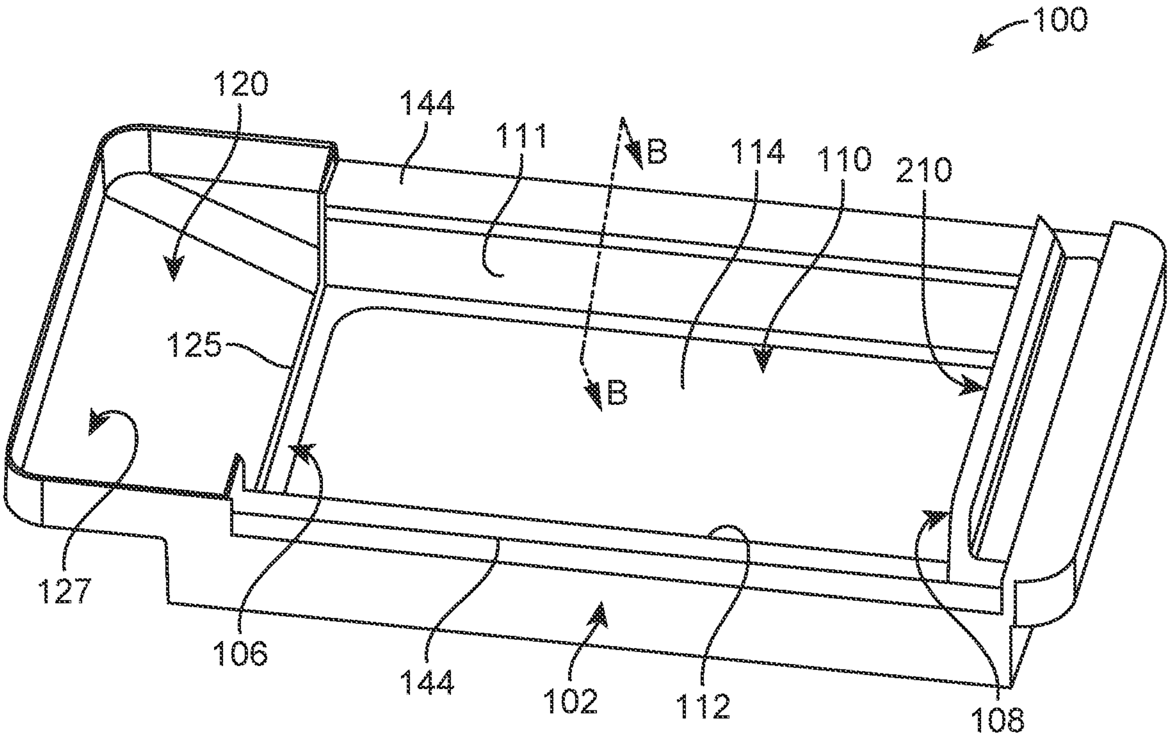
Figure 7:
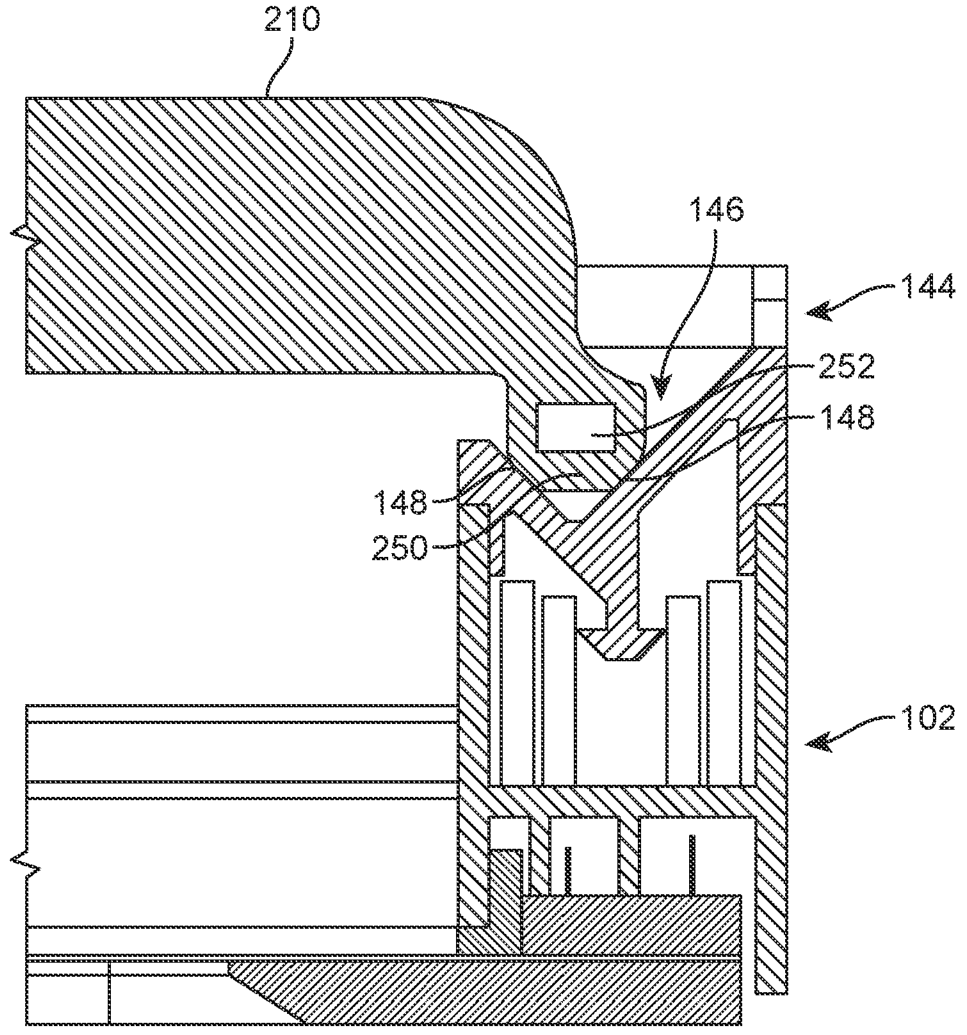

In one or more alternative embodiments, as shown in FIGS. 6-7, the scraper assembly 200 is slidably configured with the resin tank assembly 100 using one or more scraper guides 144. In some embodiments, each scraper guide 144 includes a track that extends in the direction of the desired movement. In one example, the resin tank assembly 100 includes a first scraper guide 144 configured generally along the print area's rear side 111 and a second scraper guide 144 configured generally along the print area's front side 112. In this example, the guides 144 may each extend generally from the print area's first side 106 to its second side 108 thereby facilitating the scraper member's movement along this path.

FIG. 7 shows a cross-sectional view of the guide member 144 of FIG. 6 taken from the perspective of cutlines B-B. As shown, in some embodiments, each guide 144 includes a channel 146 defined by sidewalls 148, and the scraper body 210 includes a foot 250. In some embodiments, the foot 250 may extend generally downward and the channel 146 may be accessible from above. In this way, the foot 250 may be received into the channel 146 from above and may slidably move along the channel's longitudinal length. In this arrangement, the channel sidewalls 148 are designed to hold the foot 250 within the channel 146 during the scraper body's movement to prevent the scraper body 210 from dislodging from the guide member 144.

In some embodiments, as shown in FIG. 7, the scraper body's foot 250 includes a magnet 252 and the channel sidewalls 148 include ferromagnetic metal(s) and/or alloys of the same. For example, the sidewalls 148 may include iron, cobalt, steel, nickel, manganese, gadolinium, lodestone, other ferromagnetic metals, and any combinations thereof. In this way, the magnet 252 is magnetically attracted to the sidewalls 148 thereby further holding the scraper body's foot 250 within the channel 146 during the scraper body's movement.

In some embodiments, as shown in FIG. 7, the channel sidewalls 148 form a V-shaped channel. However, it is understood that the sidewalls 148 may be configured to form other suitable cross-sectional shapes, including, but not limited to, U-shaped, W-shaped, rectangular, triangular, trapezoidal, other suitable shapes, and any combinations thereof.

Notably, the resin storage area 120 in the embodiments of FIGS. 6-7 is configured on the left side 106 of the resin tank assembly 100 such that the movements of the scraper assembly 200 described in other embodiments may be reversed. However, it is understood that the general use of the resin tank assembly 100 and/or of the scraper assembly

200 in this embodiment may be the same or similar to the general use of the resin tank assembly 100 and/or of the scraper assembly 200 in other embodiments described herein, and as such, this will not be described here again in order to avoid duplication.

Figure 8:
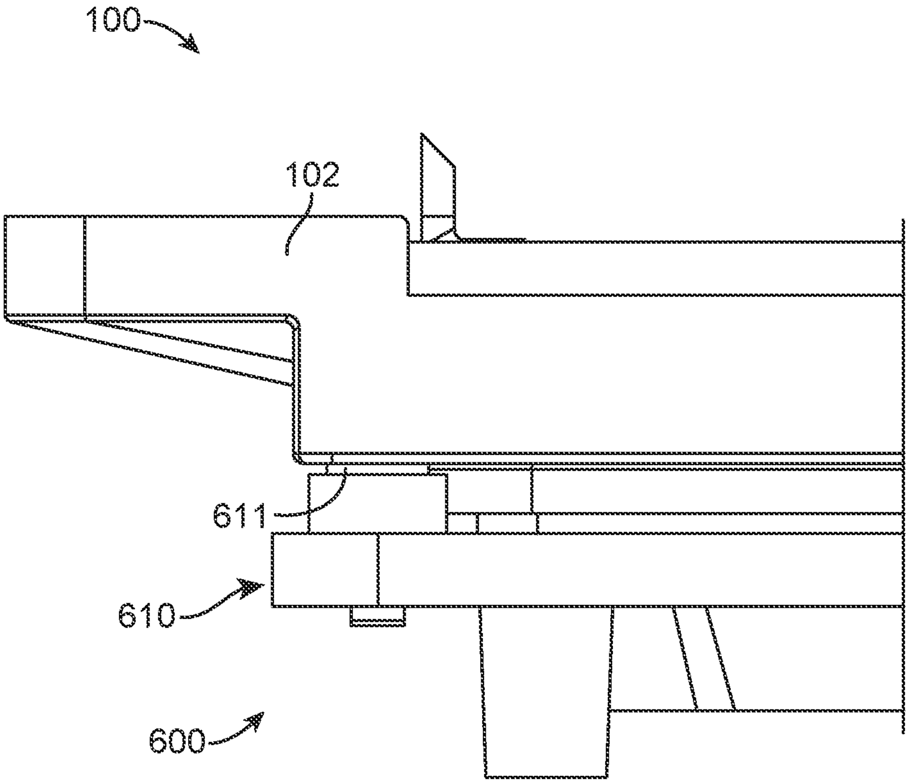
FIGS. 8-9 show aspects of resin tank assembly and a base assembly in accordance with exemplary embodiments hereof.
Figure 9:
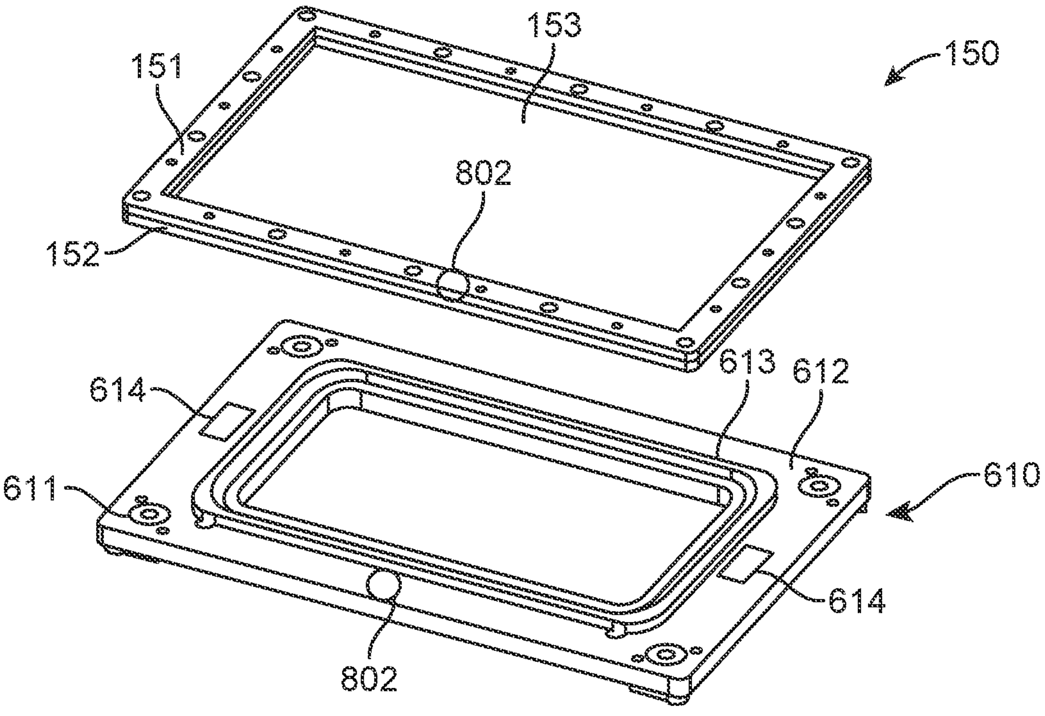

In some embodiments, as shown in FIGS. 8-9, the resin tank assembly 100 rests on and is removably coupled to an upper portion of the base assembly 600. The base assembly 600 thereby provides support and alignment to the reservoir structure 102 during use.

In some embodiments, as shown in FIG. 9, the resin tank assembly 100 comprises a film assembly 150 defining a bottom of the resin tank structure 102. In some embodiments, the film assembly 150 is configured to be removably attached to a mounting base 610 on the upper portion of the base assembly 600. In this way, the resin tank assembly 100 may be placed on top of the base assembly 600 and locked in place for use via the film assembly 150 and mounting base 610 combination (see FIG. 8), and subsequently removed when desired.

In some embodiments, the film assembly 150 includes an upper support ring 151 and a lower support ring 152, with the open interior portions of the rings 151, 152 generally matching the footprint of the resin assembly's printing area 110. In addition, a flexible film 153 (e.g., a tensioned hydrophobic member) is stretched (sandwiched) between the upper and lower support rings 151, 152 thereby extending across the entire interior portions.

In some embodiments, the base assembly's mounting base 610 also comprises a support ring 612 with an interior portion that generally matches the interior portions of the upper and lower support rings 151, 152. In addition, the mounting base ring 612 includes one or more magnets 611 (e.g., electromagnets) mounted at or near its upper surface, e.g., in each corner. In this way, the film assembly 150 may be placed upon the upper surface of the mounting base support ring 612 and be held thereto by the one or more magnets 611. Given this, it is preferable that the upper and/or lower support rings 151, 152 comprise steel, iron, and/or other ferromagnetic materials, at least in the areas that correspond to the location(s) of the one or more magnets 611 on the top of the mounting base 610. In this way, the attractive magnetic force of the magnets 611 may hold the film assembly 150 in place against the base 610.

In addition, in some embodiments, areas of the upper and/or lower support rings 151, 152 that do not correspond to locations of the magnets 611 on the mounting base 610 may comprise a lighter material such as aluminum in order to decrease the overall weight of the film assembly 150. It also is contemplated that the film assembly's lower support ring 152 include one or more magnets that may be generally aligned with the magnets 611 on the mounting base support ring 612 in order to be attracted thereto. In this case, the mounting base ring 612 may not necessarily include the magnets 611 and may comprise ferromagnetic metal(s) that may be attracted to and held by the magnets on the film assembly's lower support ring 152.

In addition, it also is contemplated that alignment structures such as alignment pins or notches also may be implemented to properly align the reservoir structure 102 in its proper placement with respect to the base assembly 600 during use.

Printing Platform Assembly 300 and Lift Arm Assembly 400

Figure 10:
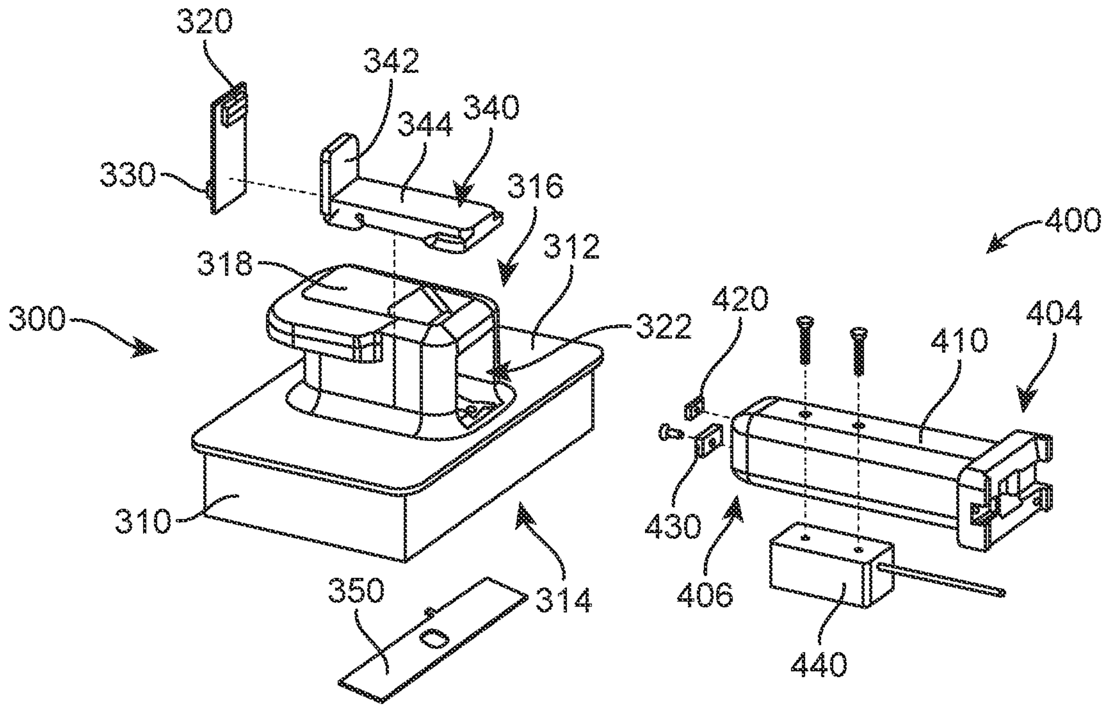
FIGS. 10-12B show aspects of a lift arm assembly and a build platform assembly in accordance with exemplary embodiments hereof.
Figure 11:
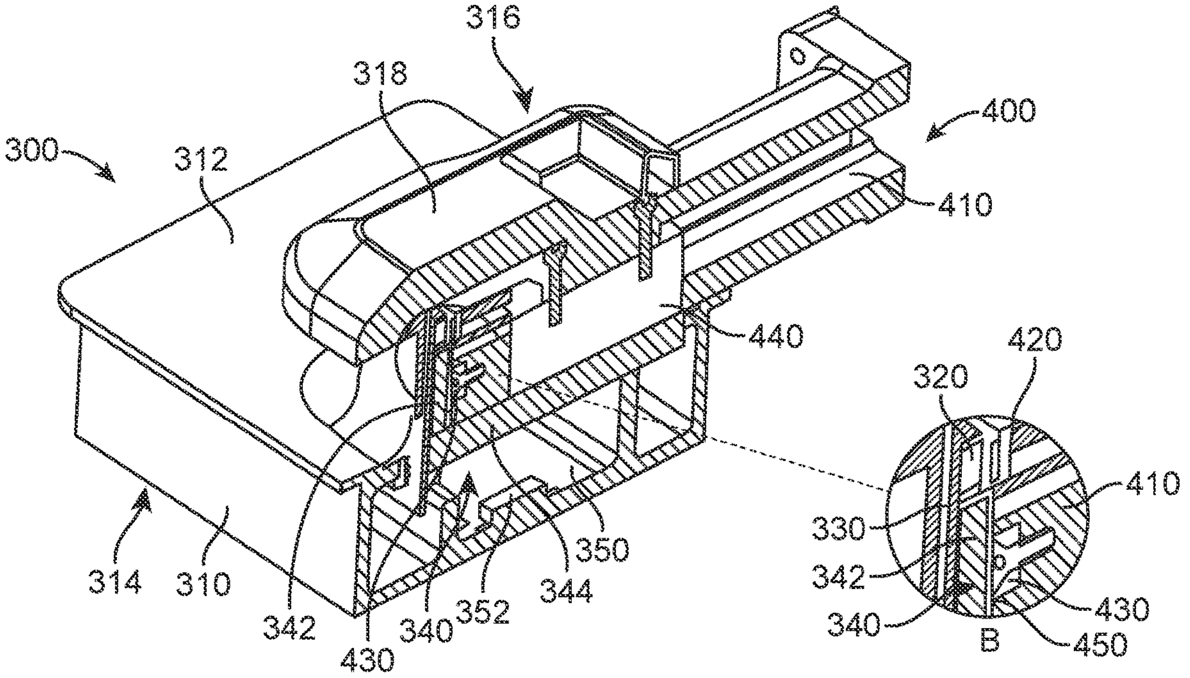

In some embodiments, as shown in FIGS. 10 and 11, the printing platform assembly 300 is removably coupled to the lift arm assembly 400. In this way, a particular printing platform assembly 300 may be attached to the lift arm assembly 400 for use, and then removed for maintenance, replacement, etc.

In some embodiments, as shown in FIG. 10, the lift arm assembly 400 includes an elongate arm body 410 including a proximal end 404 designed to be coupled to the 3D printing system's elevator assembly 900 and a distal portion 406 designed to be removably coupled to the printing platform assembly 300. The proximal end 404 and the distal portion 406 define the arm's longitudinal axis.

In some embodiments, the arm body 410 includes one or more magnets (e.g., electromagnets) configured with its distal portion 406 for securing the arm 410 to the printing platform 300. For example, the arm body 410 may include a first magnet 430 coupled to its far distal end 406 with the magnet's pole facing outward and generally parallel to the arm's longitudinal axis, and a second magnet 440 coupled to the side of its body 410 with its pole facing outward and generally orthogonal to the arm's longitudinal axis.

In some embodiments, as shown in FIG. 10, the printing platform assembly 300 includes a build platform body 310 with a top side 312 and a bottom side 314, and a coupling assembly 316 coupled to its top side 312. The coupling assembly 316 includes a coupling housing 318 including a coupling slot 322 designed to receive the distal portion 406 of the arm body 410 and to secure it therein. In this way, the printing platform assembly 300 may be releasably secured to the lift arm assembly 400.

In some embodiments, the cross-sectional shape of the coupling slot 322 generally corresponds to the cross-sectional shape of the lift arm body 410 (e.g., square, rectangular, or otherwise shaped) so that the lift arm body 410 may fit within the slot 322 without gaps.

FIG. 11 shows a side sectional view of the lift arm assembly 400 configured with the printing platform assembly 300 as describe above. As shown, in some embodiments, the coupling assembly 316 includes a ferromagnetic member 340 including a first ferromagnetic surface 342 configured generally vertically and a second ferromagnetic surface 344 configured generally horizontally. As will be described herein, the ferromagnetic member 340 may include an L-shaped member formed by the orthogonally combined first and second ferromagnetic surfaces 342, 344. In some embodiments, as shown in FIGS. 10-11, the L-shaped ferromagnetic member 340 may be positioned within the coupling slot 322 with the first ferromagnetic surface 342 defining the inner back end of the coupling slot 322 and the second ferromagnetic surface 344 defining the inner bottom surface of the coupling slot 322.

Figure 12A:
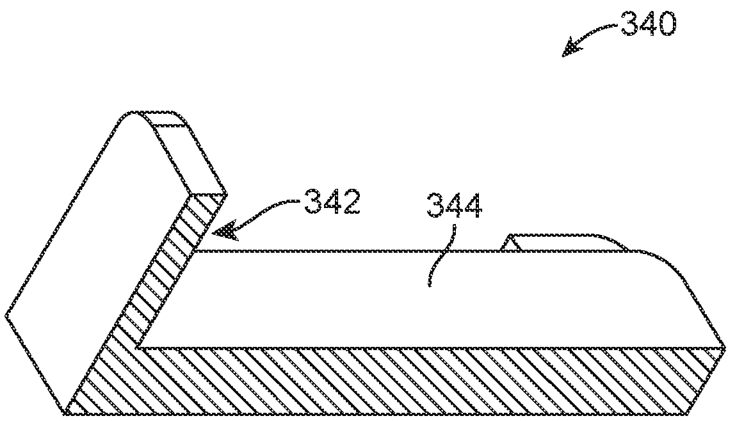
Figure 12B:
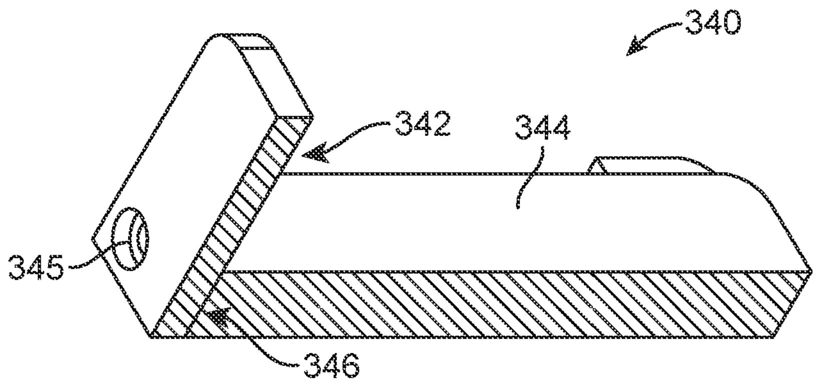

The first and second surfaces 342, 344 may be formed together (e.g., as a single L-shaped plate 340 as shown in FIG. 12A), or separately (e.g., as individual plates) and then coupled together to form the L-shaped plate 340 (e.g., as shown in FIG. 12B). Notably, the proper orientation between the first and second surfaces 342, 344 preferably matches the corresponding orientation between the first and second magnets 430, 440 so that the surfaces 342, 344 and the corresponding magnets 430, 440 properly mate when the lift arm 410 is received into the printing platform's coupling slot 322. For example, if the first and second magnets 430, 440 are orthogonal with one another, it is preferable that the first and second surfaces 342, 344 also are orthogonal with respect to one another. Regarding this concept, the inventor of the system 10 has found that during the manufacturing process, the orientation of the first and second surfaces 342, 344 is accurately controlled by forming the surfaces 342, 344 separately (e.g., as separate plates), properly machining (e.g., planing) the junction 345 between the surfaces 342, 344 to provide the desired orientation (e.g., orthogonal), and then coupling the surfaces 342, 344 together (e.g., with a locking screw 346) to form the overall L-shaped plate 340 as shown in FIG. 12B. This may further ensure a proper attachment of the lift arm 400 to the printing platform 300. It also is contemplated that the first and second surfaces 342, 344 be formed separately and held within the coupling slot 322 at the proper orientation by coupling slot internal support structures or otherwise.

FIG. 11 shows a side sectional view of the lift arm body 410 received into the slot 322 of the coupling assembly 316. As shown, the first ferromagnetic surface 342 is aligned with the first magnet 430 so that the surface 342 and first magnet 430 are magnetically attached, and the second ferromagnetic surface 344 is aligned with the second magnet 440 so that the surface 344 and second magnet 440 are magnetically attached. In this way, the printing platform assembly 300 is removably secured to the lift arm assembly 400 by the attractive magnetic forces between the magnets 430, 440 and the surfaces 342, 344, respectively.

It is understood that the magnets 430, 440 (including additional magnets) may be configured at other locations on the lift arm body 410, and that the ferromagnetic surfaces 342, 344 may be positioned in corresponding locations within the slot 322 as necessary to align with the magnets 430, 440. It also is contemplated that the lift arm body 302 be held within the slot 212 using detents, notches, latches, clamps, other securing mechanisms, and any combinations thereof.

In some embodiments, as shown in FIG. 10, the lift arm body 410 also includes a first electrical connector 420 electrically configured with a first circuit board 420 at its distal end 406, and the build platform's coupling assembly 316 includes a second electrical connector 320 electrically configured with a second circuit board 330 at the inner back end of the coupling assembly's coupling slot 322. In this way, when the lift arm body 410 is secured within the coupling slot 322 as described above, the first electrical connector 420 (on the lift arm 410) may electrically mate with the second electrical connector 320 (within the coupling slot 322) thereby electrically connecting the first circuit board 420 (on the lift arm 410) to the second circuit board 330 (within the coupling slot 322). In this way, the first and second circuit boards 420, 330, when electrically mated, may detect a proper connection between the printing platform assembly 300 and the lift arm assembly 400.

In some embodiments, as shown in FIG. 11, the system 10 includes a heating assembly 350 such as the platform heating and sensing system of U.S. patent application Ser. No. 17/990,256, filed Nov. 18, 2022, the entire contents of which are hereby fully incorporated herein by reference for all purposes.

For example, in some embodiments, as shown in FIG. 11, the heating assembly 350 includes a heating band that is coupled to the bottom surface of the hollow inner volume within the build platform body 310. In this way, the heating assembly 350 may heat the build platform's bottom side 314 via conduction through the bottom wall of the build platform body 310. In addition, when in use, the heated platform bottom side 314 may in turn heat the resin within the resin tank assembly 100 to a desired temperature thereby improving the resin's ability to properly solidify. Electrical power may be supplied to the heating assembly 350 via the electrically mated first and second circuit boards 420, 330, and/or via other electrical connections.

Figure 13:
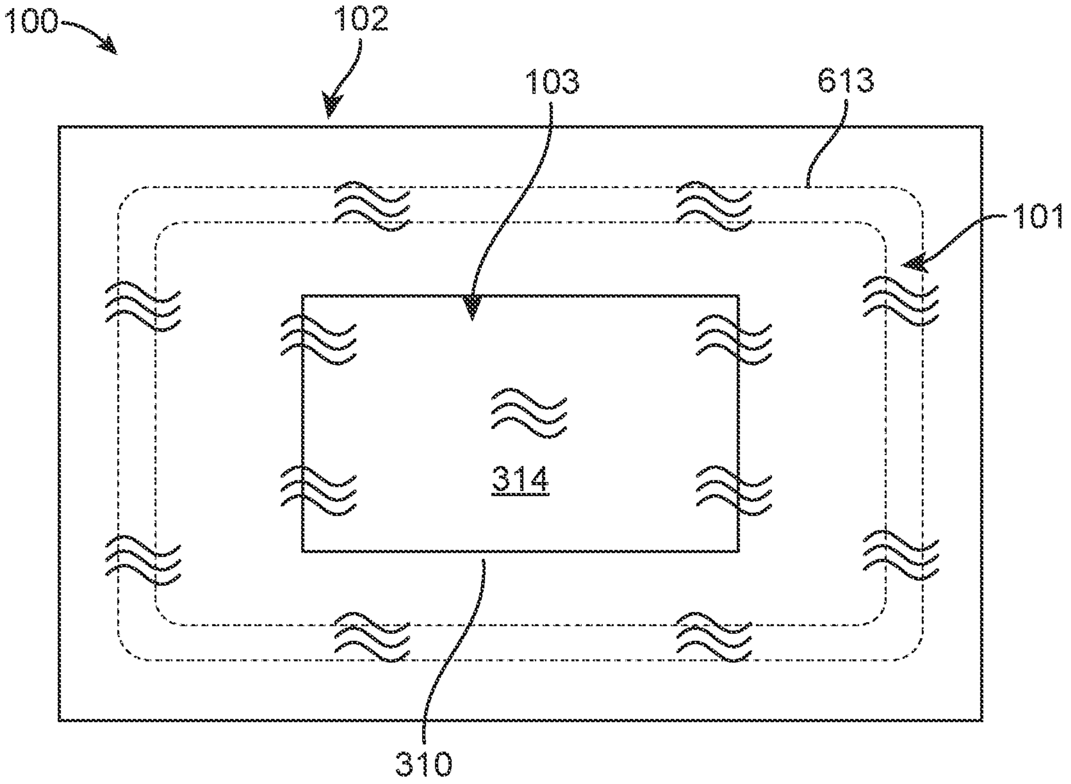
FIG. 13 shows aspects of a heating assembly in accordance with exemplary embodiments hereof.

Expanding on the concept of heating the resin during use, FIG. 13 shows a diagram representing a top view of the resin tank assembly 100 including an inner region 103 of resin and an outer region 101 of resin within the resin tank 102. As shown, when the build platform's heated bottom side 314 is submerged into the resin tank 102, the heated bottom side 314 may heat the resin in the inner region of the resin tank 102. In addition, in some embodiments, the base assembly's mounting base 610 (upon which the resin tank 102 is coupled) includes a heating mechanism 613 (e.g., a heating coil) configured to heat the resin tank's outer region 101 and the resin therein (e.g., by conduction). In this way, the resin within the resin tank 102 may be heated evenly and efficiently throughout the volume of resin.

In some embodiments, as shown in FIG. 11, the build platform assembly 300 includes a first temperature sensor 352 (e.g., an infrared sensor) configured with the heating assembly 350 and/or with the build platform body 310 (e.g., with the build platform's bottom 314). The temperature sensor 352 is configured to sense the real time temperature of the build platform's bottom 314, and by extrapolation, the temperature of the resin surrounding the build platform's bottom 314 within the resin tank assembly 100 (e.g., in the inner region 103 shown in FIG. 12).

In some embodiments, the base assembly 600 includes a second temperature sensor 614 (e.g., an infrared sensor configured with the base's upper mounting base 610, see FIG. 9) configured to sense the real time temperature of the base assembly's upper mounting base 610 and/or the resin tank's film assembly 150 attached thereto. In this way, the second temperature sensor 614 may determine the temperature of the resin within the resin tank assembly 100, e.g., the temperature of the resin in the outer region 101 shown in FIG. 13.

In some embodiments, the first and/or second temperature sensors 352, 614 continually (and/or at regular intervals) communicate the respective sensed temperatures in real time with the system 10 (e.g., to a controller) such that the temperature(s) are monitored and regulated as needed. For example, if the sensor 352 detects a temperature below a desired target temperature, the system 10 may control the heating assembly 350 to increase the heat (e.g., in the inner region 103), and if the first sensor 352 detects a temperature above the target temperature, the system 10 may command the heating assembly 350 to turn off until the temperature cools to the desired temperature. Similarly, if the second temperature sensor 614 detects a temperature below a desired target temperature, the system 10 may control the heating mechanism 613 (e.g., the heating coil) to increase the heat (e.g., in the outer region 101), and if the second sensor 352 detects a temperature above the target temperature, the system 10 may command the heating mechanism 613 to turn off until the temperature cools to the desired temperature. In this way, the system 10 includes real time overheat and underheat protection.

Figure 14:
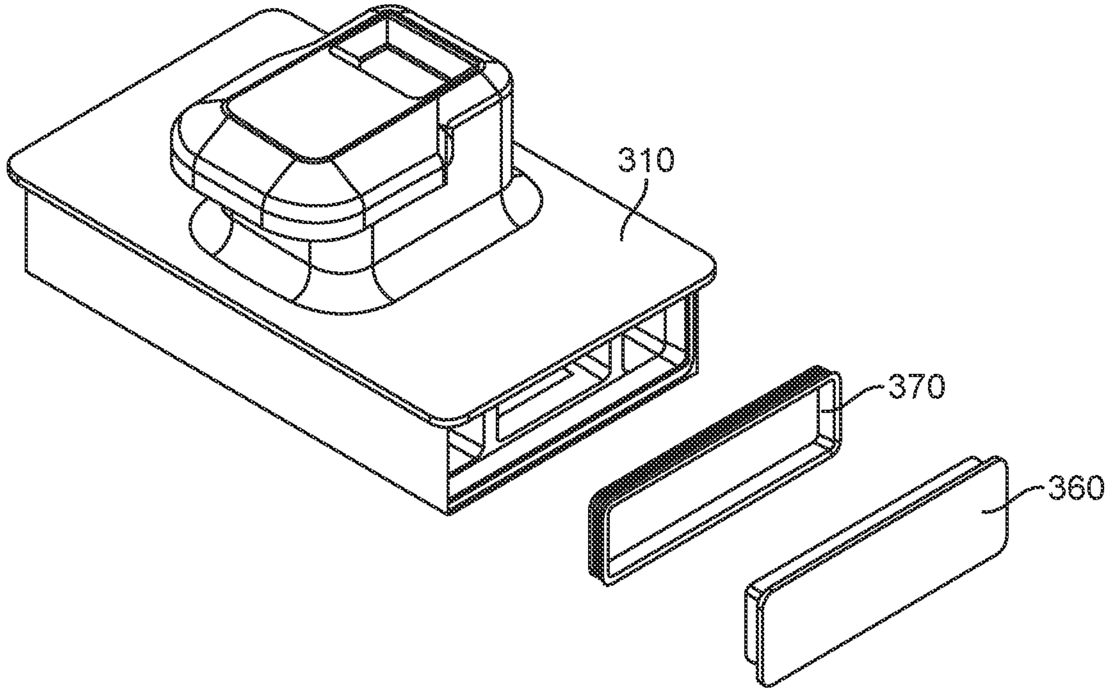
FIGS. 14-15 show aspects of a build platform assembly in accordance with exemplary embodiments hereof.
Figure 15:
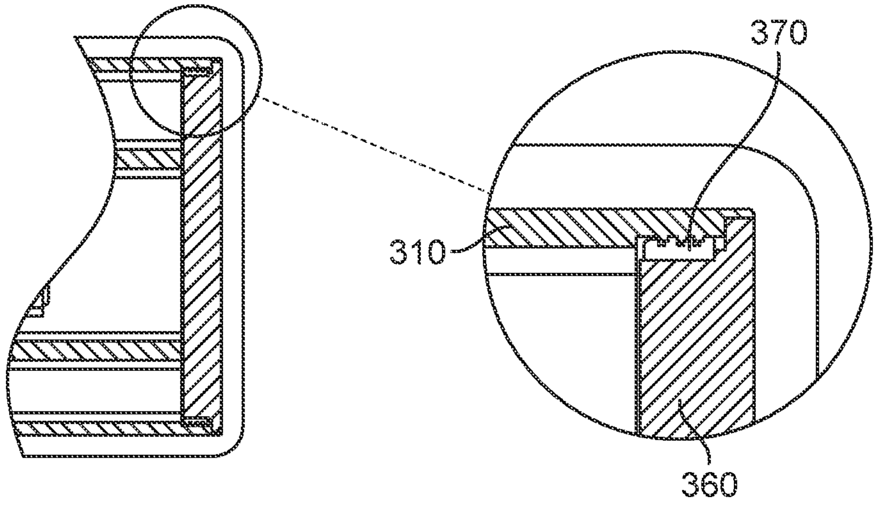

In some embodiments, as shown in FIGS. 14-15, the printing platform assembly's build platform body 310 includes one or more removable sides 360. For example, using the perspective of FIG. 14, the platform body's right side may comprise a removable side 360. In addition, the left side opposite the right side also may comprise a removable side 360. In this way, the inner volume of the platform body 310 is easily accessible by removing one or both of the sides 360. Furthermore, manufacturing the platform body 310 without the left and right sides (e.g., by molding) and then coupling the removable sides 360 to the platform body 310 to complete the unit has been found to improve the manufacturability of the platform body 310 while reducing manufacturing costs. It is understood that any other sides, e.g., the front, rear, top, and/or bottom sides also may comprise removable sides 360.

In some embodiments, each removable side 360 includes a mounting gasket 370 (e.g., a peripheral gasket) designed to seal the interface between the removable side 360 and the platform body 310. FIG. 15 shows a top sectional view of the platform body 310 configured with a removable side 360. As shown, an outer peripheral portion of the removable side 360 generally abuts into an outer circumferential notch in the side of the platform body 310 with an interior portion of the removable side 360 fitting into the platform body's side opening. The gasket 370 fits into the interface between the interior portion of the removable side 360 and the inner side wall of the platform body's side opening. In this way, the gasket 370 forms a circumferential seal between the removable side 360 and the opening in the side of the platform body 310. In some embodiments, to increase the seal, the width of the gasket 370 gradually increases from its most interior side toward its most exterior side (i.e., toward the removable side 360).

Heated Air System 700

Figure 16:
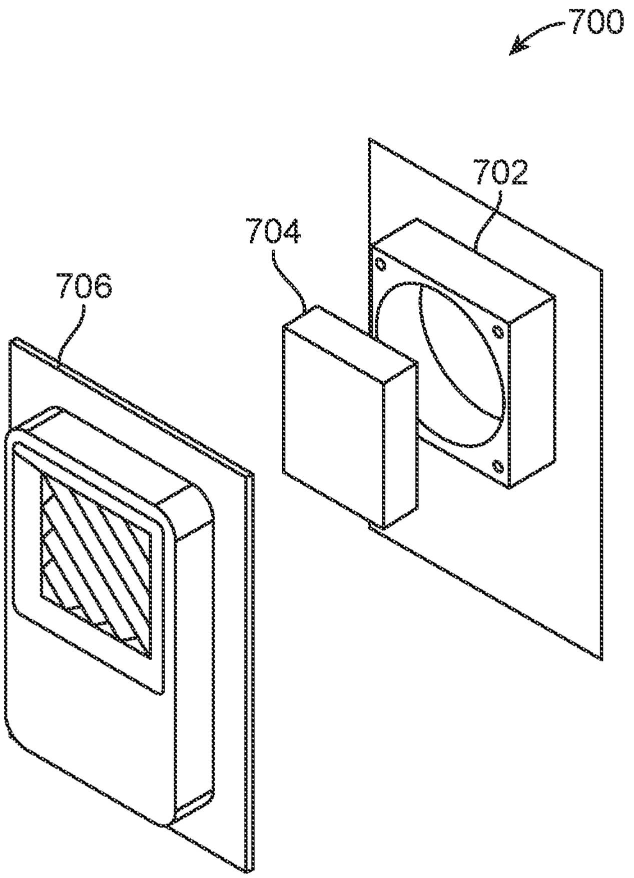
FIG. 16 shows aspects of a heated air system in accordance with exemplary embodiments hereof.

In some embodiments, as shown in FIG. 16, the system 10 includes a heated air system 700 including a fan 702, a heating element 704, and a duct 706, preferably provided as a single module. In general, the fan 702 pushes air over the heated heating element 704 thereby heating the air and passing it though the duct 706. The duct 706 is arranged to direct the heated air to a desired location of the system 10.

In some embodiments, the heated air system 700 is configured to provide heated air to the resin within the resin tank assembly 100, e.g., to the top surface of the resin within the tank 102. As such, the heated air system 700 may be located in an area immediately above and/or adjacent the upper portion of the resin tank 102. In this way, the heated air may accelerate the heating of the resin when desired and help to maintain a constant temperature in and around the resin tank assembly 100.

Resin Cartridge Assembly 500

Figure 17:
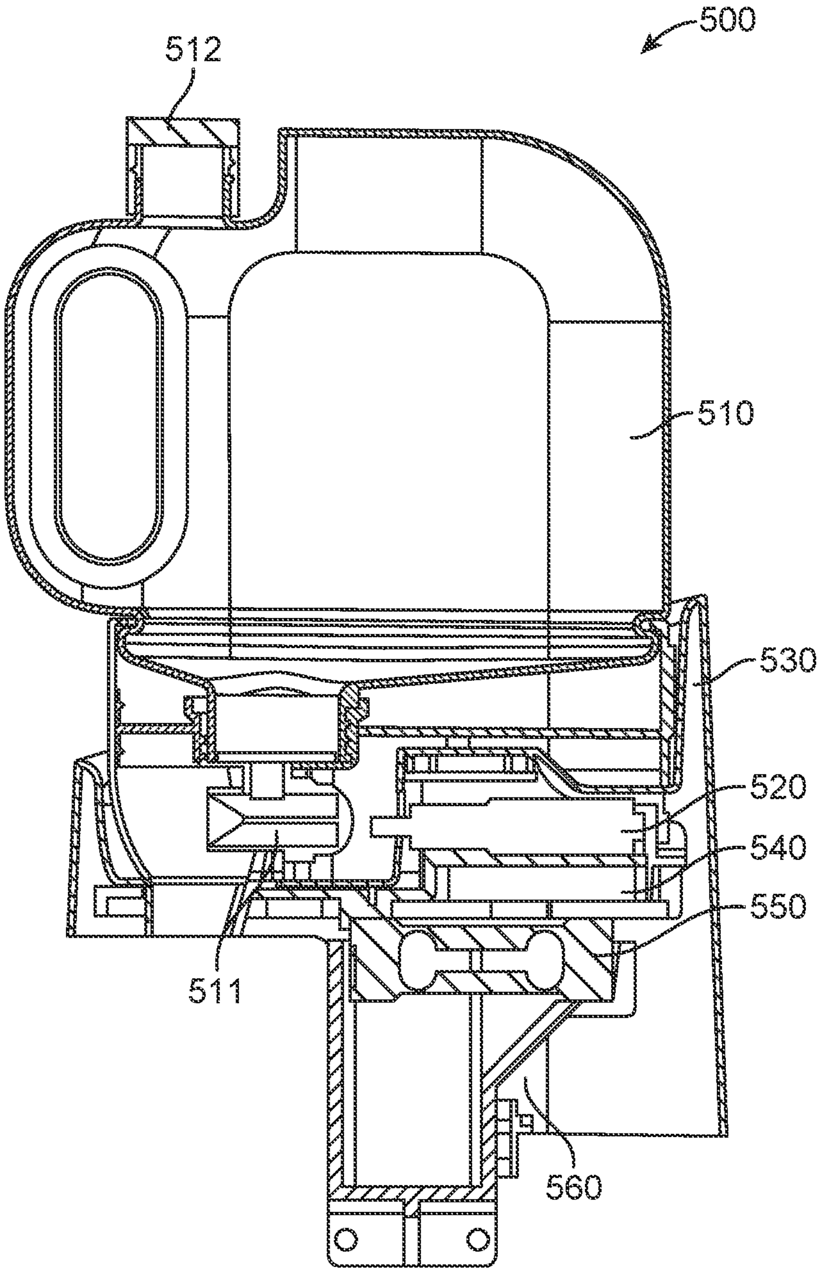
FIGS. 17-20 shows aspects of a resin cartridge assembly in accordance with exemplary embodiments hereof.
Figure 18:
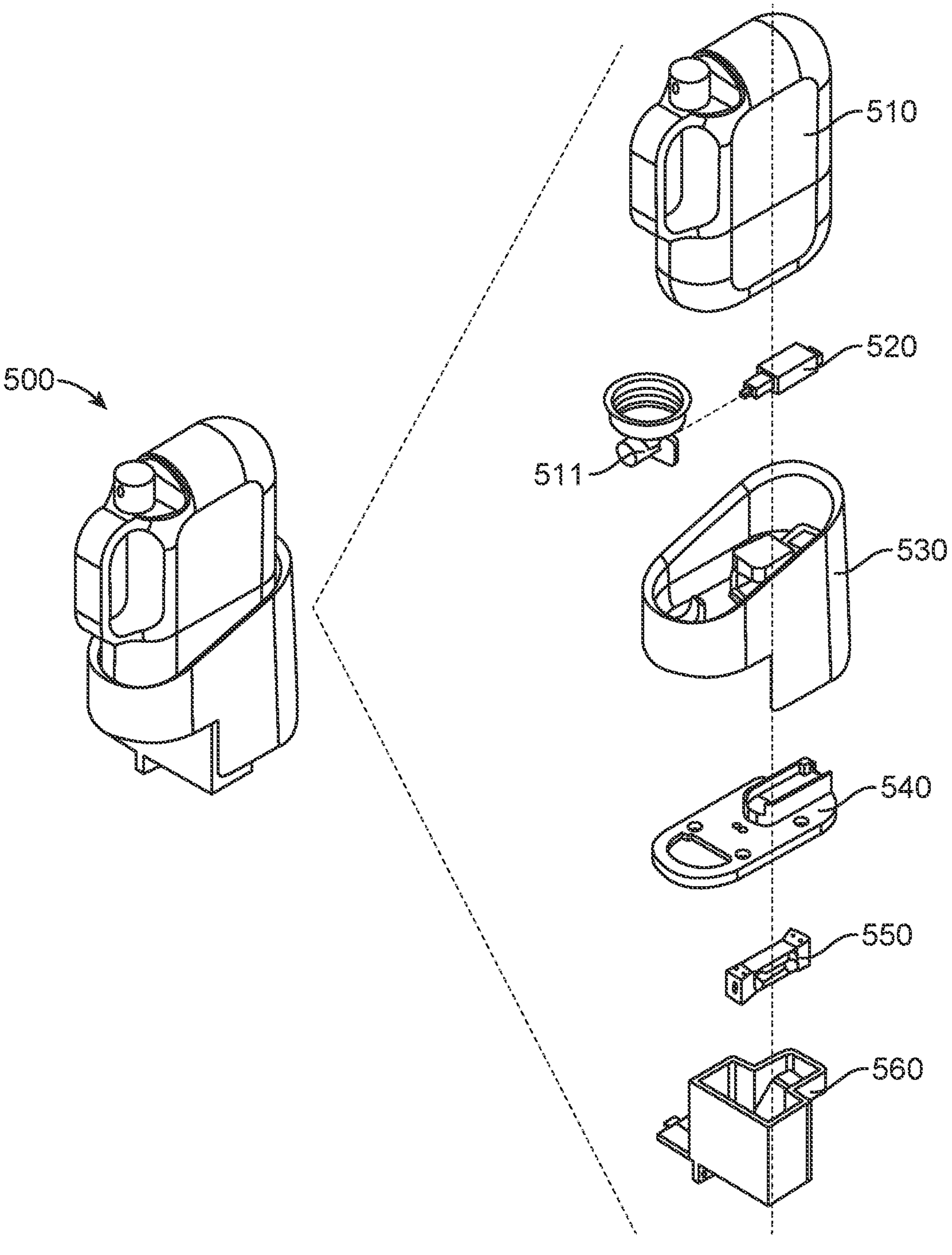

In some embodiments, as shown in FIGS. 17-18, the system 10 includes a resin cartridge assembly 500 configured to store and provide resin to the system 10, e.g., to the storage area 120 and/or other areas within the resin tank assembly 100 as required. FIG. 17 shows a side sectional view of the resin cartridge assembly 500 and FIG. 18 shows an exploded view of the same.

In some embodiments, the resin cartridge assembly 500 includes a cartridge member 510 (preferably refillable) designed to hold a volume of resin for use in 3D printing. The cartridge 510 includes a valve mechanism 511, e.g., at its lower portion, designed to open and close to dispense the resin therefrom. The valve mechanism 511 may include an actuator 520, such as a linear motor or other type of actuator, designed to cause the valve 511 to open and/or to close as instructed by the system 10. It also is contemplated that the valve 511 may be actuated manually.

In some embodiments, the valve actuator 520 is held within an actuator base member 540, and the base member 540 and the cartridge member 510 (including the valve 511) are housed within a housing 530 designed to removably receive the resin cartridge 510, e.g., through an upper opening in the housing 530. In this way, the resin cartridge 510 may be removed from the housing 530 for replacement, refilling, etc. Once refilled, the resin cartridge 510 may be placed back into the housing 530 thereby engaging the cartridge 510, the valve 511, and the actuator 520 for use.

In some embodiments, the actuator base member 540 is configured to bear the weight of the resin cartridge 510, and furthermore, is equipped with a weight sensor 550 (e.g., a strain gauge) designed to detect the weight that the base member 540 is bearing at any moment in time. In this way, the system 10 may weigh the resin cartridge 510, and through calculations, may determine the volume of resin within the cartridge 510. If the system 10 determines that the amount of resin within the cartridge 510 is insufficient to print the current 3D printing object, the system 10 may alert the user to refill and/or exchange the cartridge 511 with a fuller one. It is understood that the weight sensor 550 may be placed in other locations and/or configured with other elements in order to weigh the resin cartridge 510. For example, the weight sensor 550 may be configured on the resin cartridge 550 itself and/or located in other areas within the housing 530.

When additional resin is required within the resin tank assembly 100, the system 10 controls the valve actuator 520 to open the valve 511 such that resin may flow from the cartridge 510 into the resin tank 100. In addition, the system 10 may dispense a specific amount of resin from the cartridge 510 into the resin tank by continually weighing the cartridge 510 during the dispensing of the resin and monitoring the cartridge's continual change in weight. By monitoring the change in weight in real time and knowing the resin's weight per volume, the system 10 may correlate the change in weight to the amount of resin leaving the cartridge 510 in real time and close the valve 511 when the desired amount of resin has been dispensed.

Figure 19:
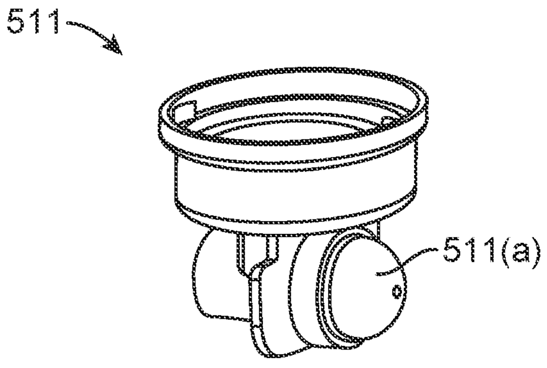
Figure 20:
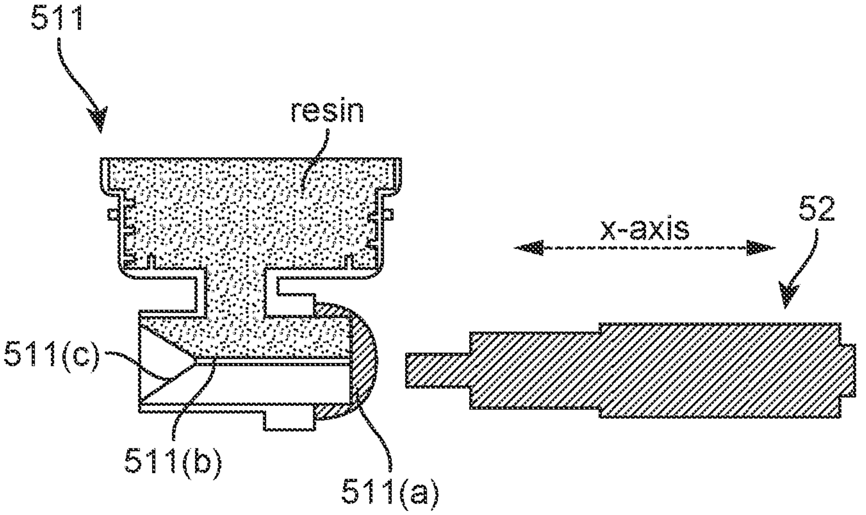

FIG. 19 shows a schematic of the valve mechanism 511 and FIG. 20 shows the valve mechanism 511 aligned with the valve actuator 520. In some embodiments, as shown in FIGS. 19-20, the valve 511 includes a flexible domed seal 511(*a*), an umbrella seal 511(*c*), and a connecting rod 511(*b*) extending between the domed seal 511(*a*) and the umbrella seal 511(*c*). As shown in FIG. 20, when the system 10 controls the actuator 520 to open the valve 511, the actuator 520 (e.g., a linear motor) is caused to move linearly against the valve's domed seal 511(*a*) as represented by the X-axis arrow. The linear motor 520 may thereby press against the domed seal 511(*a*) thereby depressing it and causing the connecting rod 511(*b*) to translate in the direction of the actuator's movement. This linear translation of the connecting rod 511(*b*) in turn presses against the umbrella seal 511(*c*) causing a gap to form between the umbrella seal 511(*c*) and the valve body through which resin from the cartridge 510 may flow.

In some embodiments, the working stroke of the linear motor 520 may be controlled and adjusted by the system 10 depending on the viscosity of the resin being dispensed by the cartridge 510. For example, if the resin has a higher viscosity and therefore a slower flow rate, the working stroke of the linear motor 520 may be controlled to be longer (e.g., 10 mm-15 mm) thereby increasing the gap formed in the umbrella seal 511(*c*) and increasing the flow of resin therethrough. Conversely, for lesser viscous resin, the working stroke of the linear motor 520 may be lessened such that the gap formed in the umbrella seal 511(*c*) is smaller thereby providing a slower flow rate through the valve 511.

In some embodiments, as shown in FIG. 17, the resin cartridge 510 includes an inlet valve 512 (e.g., a one-way valve) designed to allow air to pass into the cartridge 510 as the resin is dispensed. In this way, the inlet valve 512 may balance the internal and external air pressure of the cartridge 510, thereby allowing the resin to flow smoothly through the valve 511 without back pressure.

Detection System 800

Figure 21:
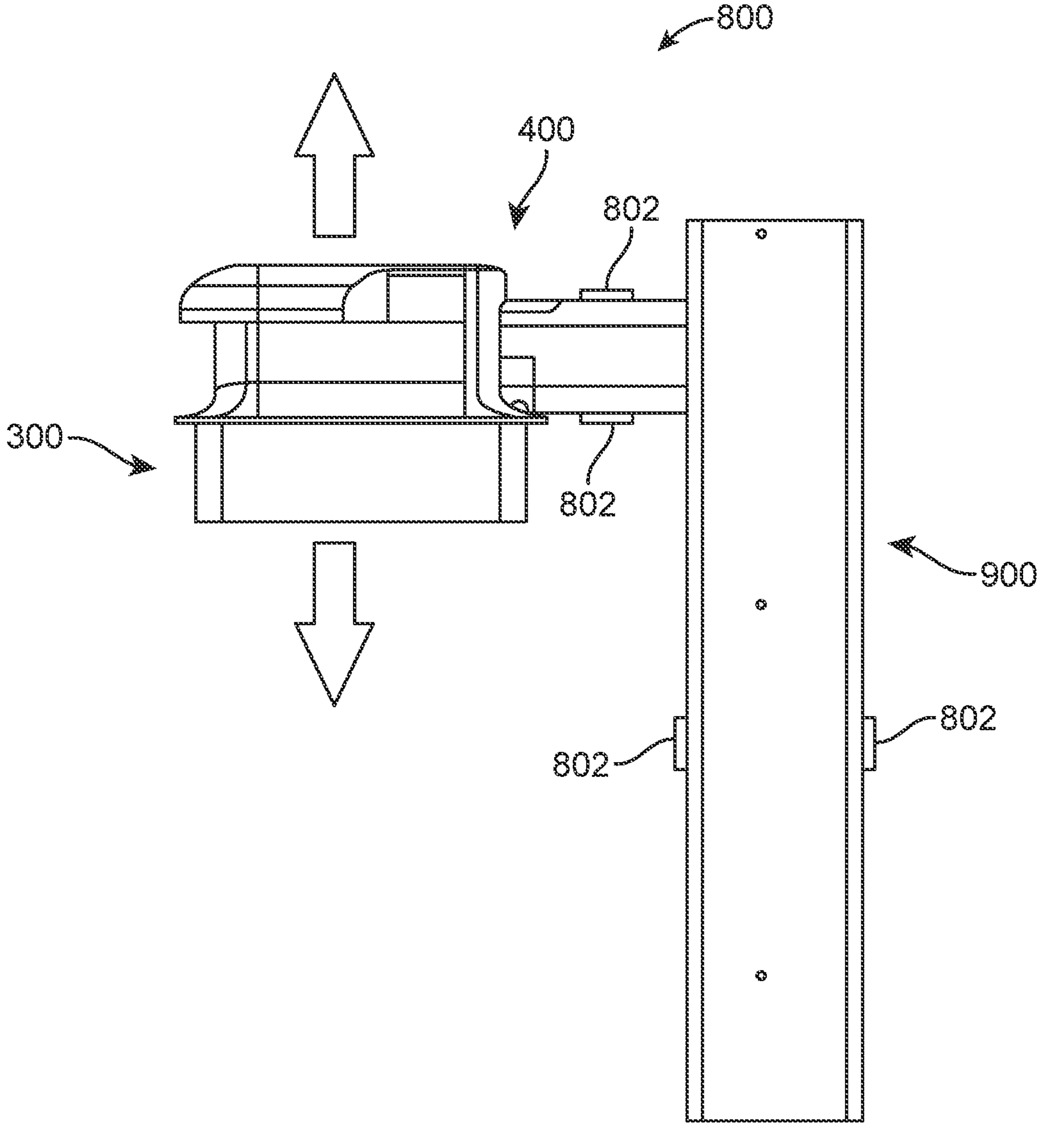
FIG. 21 shows aspects of a detection system in accordance with exemplary embodiments hereof.

In some embodiments, as shown in FIG. 21, the system 10 includes a resin level detection system 800 designed to measure the level of the resin within the resin tank structure 102 at any moment in time.

In some embodiments, as shown in FIG. 21, the resin level detection system 800 includes one or more sensors 802 (e.g., strain gauges and/or other suitable types of sensors) configured with the build platform assembly 300, the printing arm assembly 400, and/or with the elevator assembly 900. The sensors 802 are designed to sense vibrations and/or other types of movements of the assemblies 300, 400, 900 and to convert the sensed vibrations to electrical currents and/or voltages that may be sensed and interpreted by the system 10. In some embodiments, the sensed vibrations may then be correlated to attributes of the system 10 and used to determine various system conditions (e.g., the signals may be used to determine the relative positions of the assemblies 300, 400, 900).

In some embodiment, because the build platform assembly 300, the printing arm assembly 400, and the elevator assembly 900 are mechanically configured together, the assemblies 300, 400, 900 may be viewed as a single mass structure at any moment in time. In this way, the sensors 802 may be configured in a variety of locations on or about the assemblies 300, 400, 900 and may be used to sense vibrations caused by and/or permeating through the assemblies 300, 400, 900.

For example, in some embodiments, as shown in FIG. 21, a first sensor 802 may be configured with an upper portion of the lift arm assembly 400 (e.g., on an upper surface of the arm body 410), and/or a second sensor 802 may be configured with a lower portion of the lift arm assembly 400 (e.g., on a lower surface of the arm body 410). In this way, strains applied to the lift arm assembly 400 may be sensed and converted to electrical signals. In another example, a first sensor 802 may be configured with a front portion of the elevator assembly 900 and a second sensor 802 may be configured with a rear portion of the elevator assembly 900, and the sensors 802 may sense the associated vibrations. It is understood that one or more sensors 802 may be configured with any of the assemblies 300, 400, 900 (and/or with other assemblies of the system 10) and that the scope of the system 10 is not limited in any way by the number and/or locations of the sensors 802.

In a first implementation of the resin level detection system 800, the sensors 802 may be configured to sense the vibrations caused when the build platform assembly 300 is lowered from a position above the top level of resin within the resin tank assembly 100 to a position where the bottom 314 of the build platform assembly 300 first intersects the upper surface of the resin within the resin tank assembly 100. That is, when the bottom 314 of the build platform 300 hits the upper surface of the resin within the resin tank 102, this impact will cause a vibration within the build platform 300 that may be sensed by the sensors 802 (e.g., by sensors 802 configured on the lift arm assembly 400). Accordingly, when this vibration occurs, the system 10 may determine the upper level of the resin and through calculations, the volume of resin within the tank 102.

In a second implementation, the detection system 800 may include one or more weight sensors 802 (e.g., strain gauges) configured with the resin tank assembly 100 (e.g., with resin tank's film assembly 150, see FIG. 9) and/or with the base assembly 600 (e.g., with the base's mounting base 610, see FIG. 9) to sense vibrations permeating through these assemblies 100, 600. In a third implementation utilizing this same arrangement of sensors 802, the sensors 802 may weigh the assembly 100 to determine the volume of resin within the resin tank structure 102.

After determining the level of resin within the tank 102, the system 10 also may calculate the volume of resin needed to complete the current print job (e.g., using the design information of the object being printed) and compare this amount with the volume of resin determined to be in the tank 102. If the measured current volume of resin is determined to be insufficient to complete the current 3D printing process, the system 10 may trigger the resin cartridge assembly 500 to dispense additional resin into the tank 102, and because the system 10 may determine the amount of additional resin needed (the amount required minus the amount already available), it may cause only this amount (plus a nominal overfill amount if desired) to be dispensed thereby avoiding resin waste.

Locking System 1000

In some embodiments, as shown in FIGS. 22-27, the system 10 includes a zero-compression locking system 1000 (e.g., zero-compression) used to adjust the parallelism between the build platform assembly 300 (e.g., the bottom side 314 of the build platform body 310) and the base assembly 600 (e.g., an upper portion of the base assembly 600, the base assembly's mounting base 610*k*, and/or another suitable resin tank cradle). For the purposes of this specification, the zero-compression locking system 1000 will be described in relation to the mounting base 610, but it is understood that the locking system 1000 also may be used to adjust the parallelism of other types of resin tank cradles. In addition, it is understood that because the mounting base 610 supports the resin tank assembly 100, parallelism adjustment of the mounting base 610 also may adjust the ultimate parallelism of the resin tank 102 resting thereon.

Figure 22:
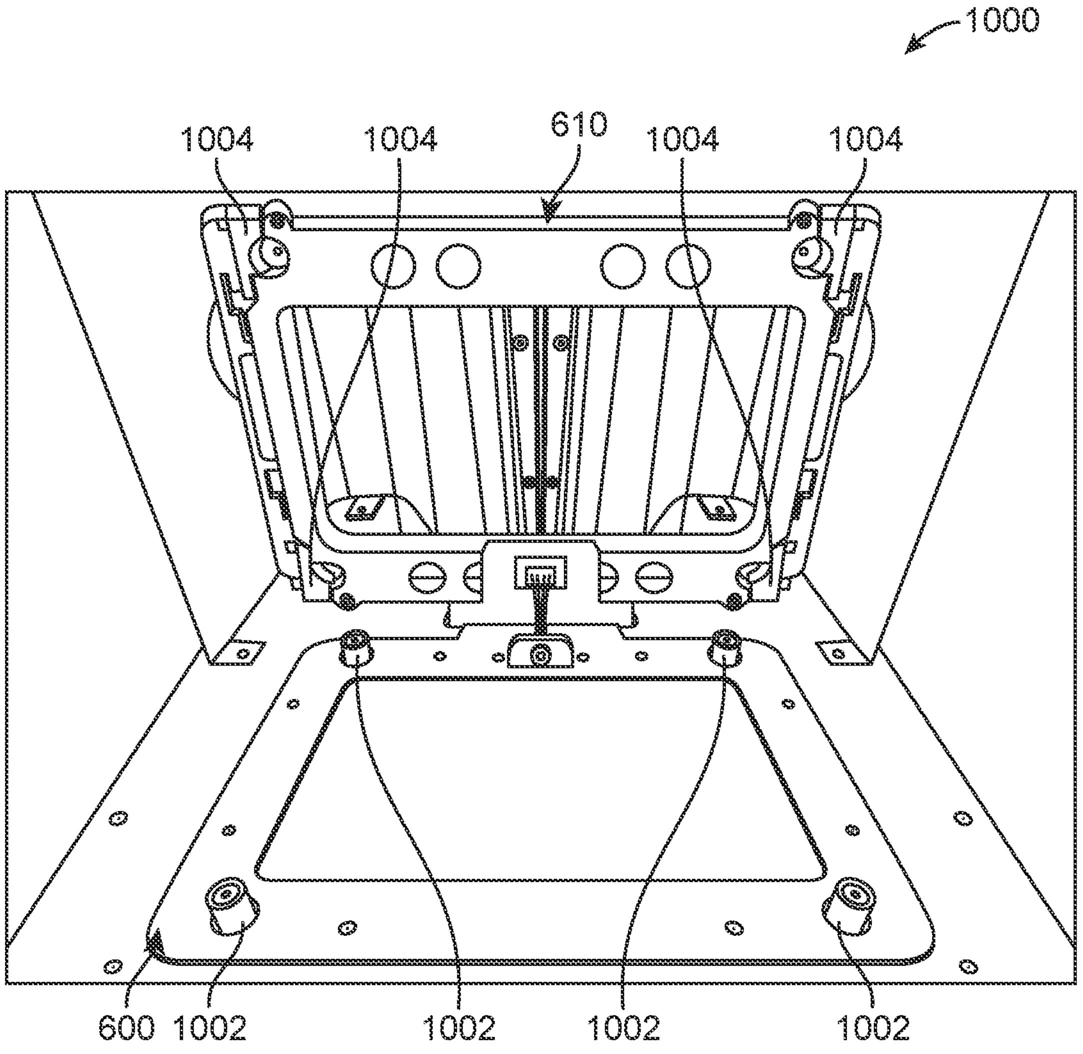
FIGS. 22-27 show aspects of a locking system in accordance with exemplary embodiments hereof.
Figure 23:
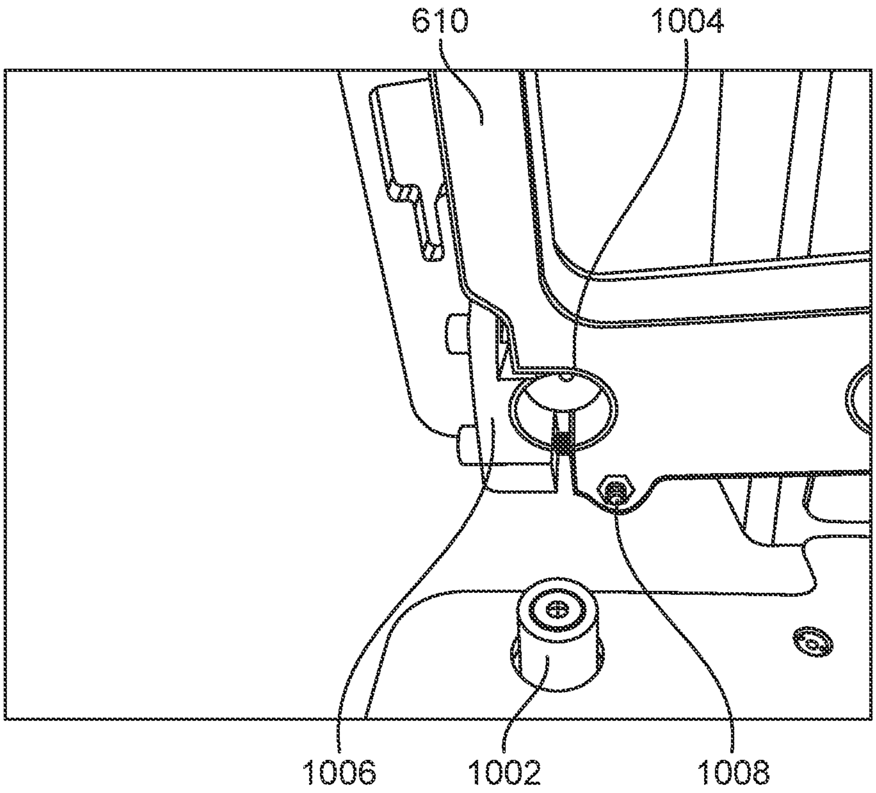

In some embodiments, as shown in FIG. 22, an upper portion of the base assembly 600 below the mounting base 610 includes one or more vertical posts 1002 and the mounting base 610 includes one or more openings 1004, with each of the one or more openings 1004 configured to receive a corresponding post 1002. In addition, as shown in FIG. 23 (a close-up view of portion of FIG. 22), the openings 1004 are each configured with an associated clamping member 1006 configured to increase or decrease the width (e.g., the diameter) of the corresponding opening 1004. As shown, the clamping members 1006 may be adjusted by one or more tightening screws and/or by using any other similar tightening mechanism. In this way, when each post 1002 is properly configured with its corresponding opening 1004, the post 1002 may be locked within the opening 1004 by tightening the associated clamping member 1006.

Figure 24:
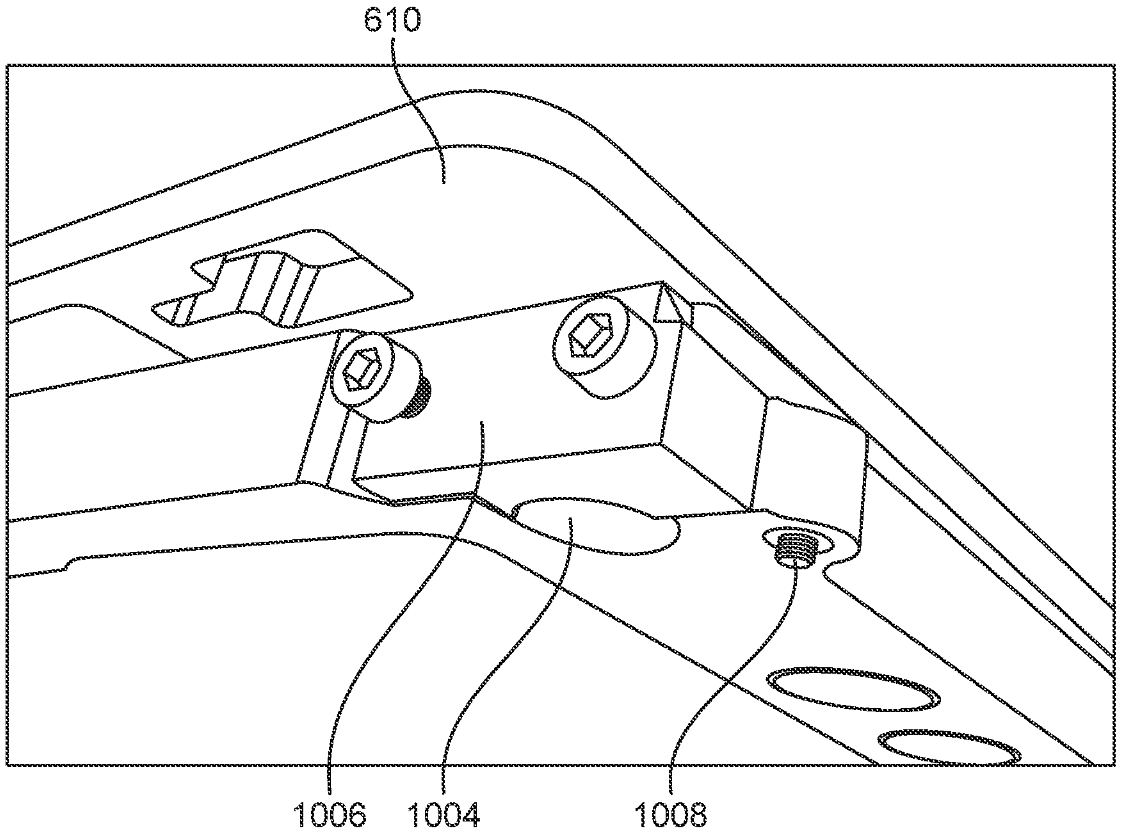

In addition, in some embodiments, as shown in FIGS. 23-24, the locking system 1000 includes one or more set screws 1008, with one set screw 1008 preferably configured adjacent a corresponding post 1002 and opening 1004 combination. The set screws 1008 extend through the mounting base 610 from top to bottom to make physical contact with the surface of the base assembly 600 beneath the mounting base 610. In this way, the set screws 1008 may be used to set the height of the gap between the mounting base's bottom surface and the upper surface of the base assembly 600 below.

Figure 25:
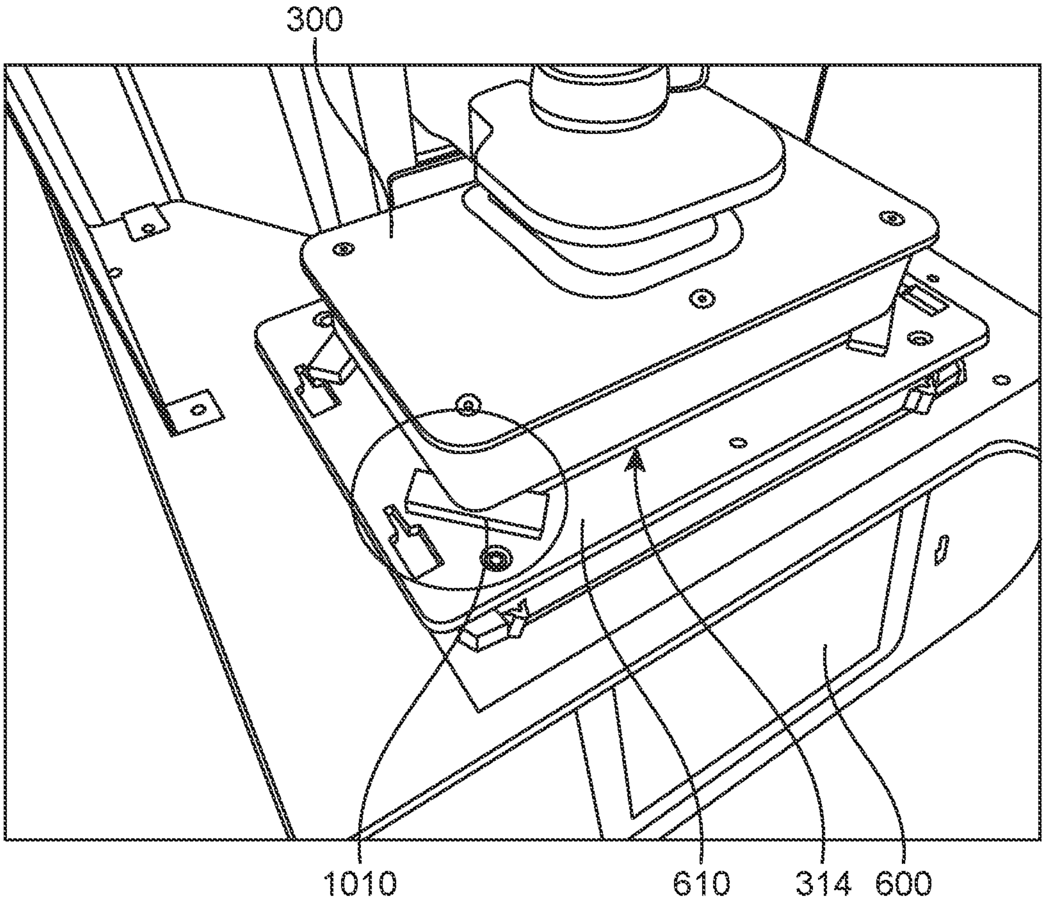
Figure 26:
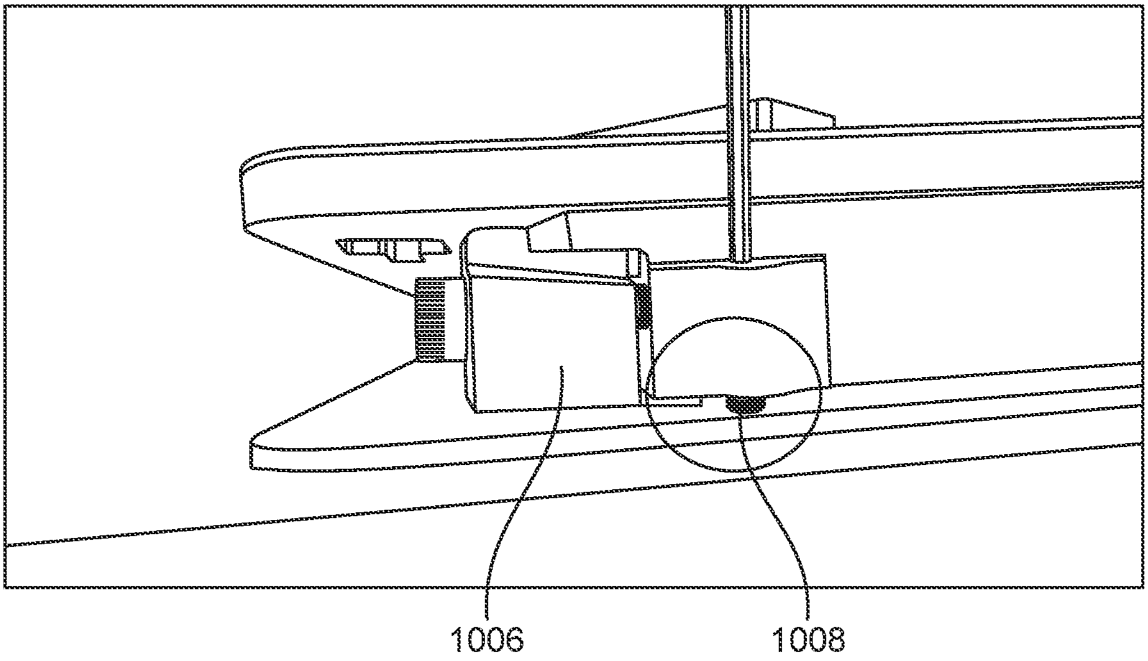
Figure 27:
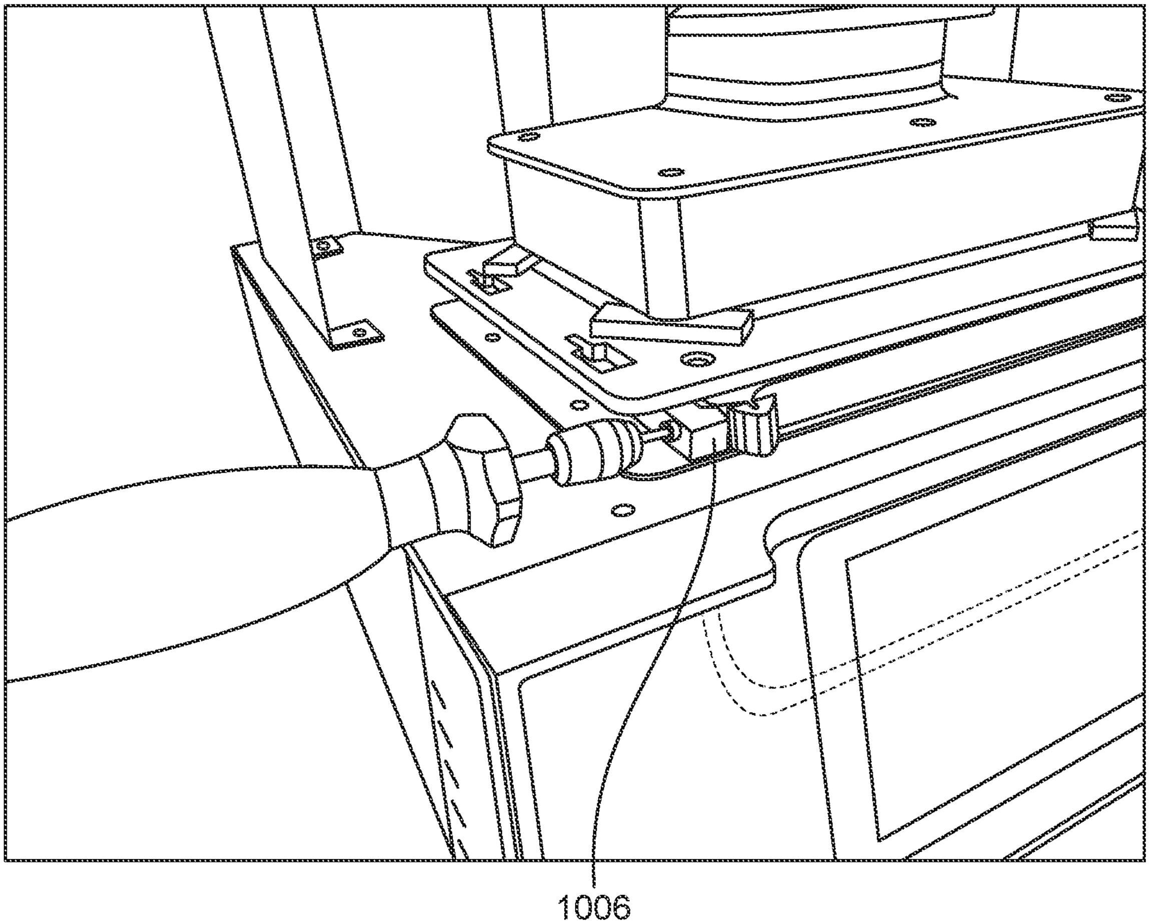

In use, as shown in FIG. 25, the mounting base 610 is placed on top of the base assembly 600 with each of the posts 1002 received into a corresponding opening 1004 and with the clamps 1006 all untightened. Precise spacer elements 1010, e.g., shims, are placed on top of the mounting base 610 (e.g., in each corner) and the build platform assembly 300 is then lowered such that its bottom surface 314 contacts the shims 1010. The shims 1010 are then checked for gaps and relative looseness so that the parallelism adjustments may be performed. For each shim that has a gap between itself and the bottom 314 of the build platform 310, the corresponding set screw 1008 is adjusted to lift the base assembly 610 until the gap is removed (see FIG. 26). This process may be iterative between one or more of the shims 1010 until all of the gaps between each of the shims 1010 and the build platform's bottom surface 314 are removed. In some cases, the set screws 1008 may be used to lower the base assembly 610 as required. When the gaps are all removed, the top of the base assembly 610 may be deemed parallel with the bottom surface 314 of the build platform 310, and the associated clamping members 1006 may all be tightened to lock the base assembly 610 in place (see FIG. 27). The build platform 300 may then be lifted, the shims 1010 may be removed, and the resin tank assembly 100 may be attached to the base assembly 610. With the resin tank assembly 100 parallel with the base assembly 610, it also may now be parallel to the bottom side 314 of the build platform 310 because of this process.

It is understood that the actions described above are meant for demonstration and that other actions may be taken. It also is understood that not all of the actions may be necessary and that the actions may be taken in different orders.

It is understood that any aspect or element of any embodiment described herein or otherwise may be combined with any other aspect or element of any other embodiment to form additional embodiments of the system 10, all of which are within the scope of the system 10.

Where a process is described herein, those of ordinary skill in the art will appreciate that the process may operate without any user intervention. In another embodiment, the process includes some human intervention (e.g., a step is performed by or with the assistance of a human).

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs," and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only," the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A printing platform assembly for use with a three-dimensional (3D) printing system comprising:

- a build platform body including a first ferromagnetic surface and a second ferromagnetic surface, wherein the build platform body is adapted to removably couple the printing platform assembly to a lift arm assembly of the 3D printing system; and
- a coupling assembly including a coupling housing with a coupling slot adapted to receive and releasably secure a distal portion of an arm body of the lift arm assembly.

2. The build platform body of claim 1, wherein the first ferromagnetic surface and the second ferromagnetic surface are positioned orthogonally with respect to each other.

3. The printing platform assembly of claim 1, wherein the first ferromagnetic surface is configured generally vertically.

4. The printing platform assembly of claim 1, wherein the second ferromagnetic surface is configured generally horizontally.

5. The printing platform assembly of claim 1, wherein the first ferromagnetic surface and the second ferromagnetic surface are positioned to correspond with a first magnet and a second magnet of the lift arm assembly, respectively, to facilitate mating of the printing platform assembly and the lift arm assembly.

6. A lift arm assembly for use with a three-dimensional (3D) printing system comprising:

- a lift arm body including a proximal end and a distal portion, wherein the proximal end is adapted to be coupled to an elevator assembly of the 3D printing system and the distal portion is adapted to be removably coupled to a printing platform assembly of the 3D printing system; and
- a first magnet coupled to the distal end, the first magnet generally parallel to a longitudinal axis of the lift arm body; and
- a second magnet coupled to the lift arm body, the second magnet generally orthogonal to the longitudinal axis of the lift arm body.

7. The lift arm assembly of claim 6, wherein the proximal end and the distal portion define the longitudinal axis of the lift arm assembly.

8. The lift arm assembly of claim 6, wherein the lift arm body has a cross-sectional shape adapted to fit a corresponding printing platform assembly.

9. The lift arm assembly of claim 6, wherein the lift arm body is adapted to register with a coupling slot of the printing platform assembly without gaps.

10. A three-dimensional (3D) printing system comprising:
a resin tank including a printing area;
an elevator assembly;
a lift arm assembly including a lift arm body and a plurality of magnets, wherein
the lift arm body includes a proximal end and a distal portion, wherein the proximal end is adapted to be coupled to the elevator assembly and the distal portion is adapted to be removably coupled to a printing platform assembly; and
the plurality of magnets is adapted to releasably secure the lift arm body to the printing platform assembly; and
the printing platform assembly including a build platform body and a coupling assembly, wherein
the build platform body includes a plurality of ferromagnetic surfaces; and
the coupling assembly includes a ferromagnetic member and a coupling housing, the coupling housing including a coupling slot adapted to receive and releasably secure the distal portion of the arm body of the lift arm assembly.

11. The 3D printing system of claim 10, wherein the plurality of magnets includes a first magnet and a second magnet, the first magnet parallel to the longitudinal axis to the lift arm body and the second magnet orthogonal to the longitudinal axis of the lift arm body.

12. The 3D printing system of claim 10, wherein the build platform body further includes a top side and a bottom side, the top side coupled to the coupling assembly.

13. The 3D printing system of claim 10, wherein the coupling slot has a cross-sectional shape adapted to fit a corresponding cross-sectional lift arm body without gaps.

14. The 3D printing system of claim 10, wherein the ferromagnetic member includes a first ferromagnetic surface and a second ferromagnetic surface, the first ferromagnetic surface configured generally vertically and the second ferromagnetic surface configured generally horizontally orthogonally.

15. The 3D printing system of claim 14, wherein the ferromagnetic member further includes an L-shaped member formed by orthogonally combined combining the first and second ferromagnetic surfaces.

16. The 3D printing system of claim 14, wherein the first and second ferromagnetic surfaces are adapted to mate with the first and second magnets, respectively.

* * * * *